United States Patent
Barfield, Jr.

(10) Patent No.: US 9,967,701 B1
(45) Date of Patent: May 8, 2018

(54) PRESSURE SENSOR ASSISTED POSITION DETERMINATION

(71) Applicant: Verizon Patent and Licensing Inc., Arlington, VA (US)

(72) Inventor: James Ronald Barfield, Jr., Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 183 days.

(21) Appl. No.: 14/690,878

(22) Filed: Apr. 20, 2015

(51) Int. Cl.
*H04W 4/02* (2018.01)
*G01C 21/00* (2006.01)
*G01L 13/00* (2006.01)

(52) U.S. Cl.
CPC .............. *H04W 4/02* (2013.01); *G01C 21/00* (2013.01); *G01L 13/00* (2013.01)

(58) Field of Classification Search
CPC ....... H04W 64/00; H04W 4/02; H04W 4/021; H04W 4/12

USPC .............................................. 455/456.1–457
See application file for complete search history.

(56) References Cited

U.S. PATENT DOCUMENTS

| | | | |
|---|---|---|---|
| 2014/0081572 A1* | 3/2014 | Poornachandran | H04W 4/02 701/537 |
| 2014/0323160 A1* | 10/2014 | Venkatraman | G01S 5/0236 455/456.6 |
| 2015/0006100 A1* | 1/2015 | Jackson | G01C 5/06 702/94 |

* cited by examiner

*Primary Examiner* — Sam Bhattacharya

(57) ABSTRACT

A method may perform assisted position determination based on pressure measurements which includes ascertaining a pressure value, and determining whether the ascertained pressure value is within a first threshold of a stored pressure value of the set of stored position and pressure values. The method may also include obtaining a stored position value, from the set of stored position and pressure values, which corresponds to the stored pressure value, in response to determining that the ascertained pressure value is within the first threshold of the stored pressure value, and providing the stored position value as a current location along the route.

20 Claims, 11 Drawing Sheets

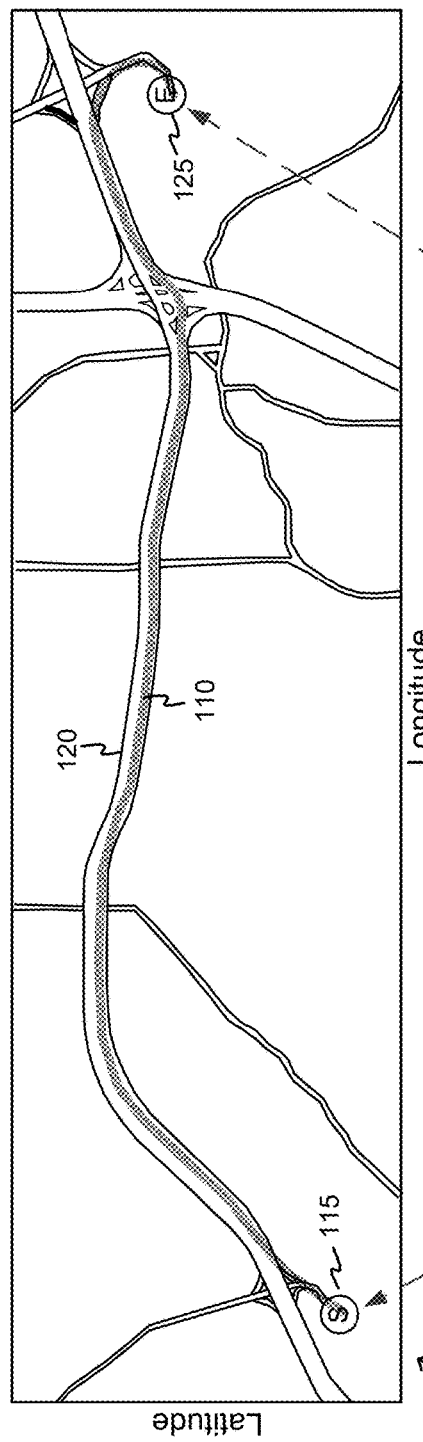
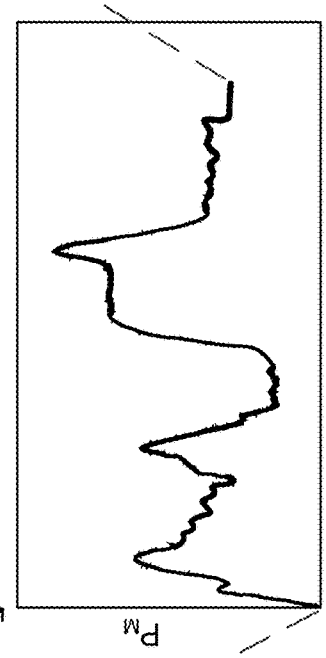
Fig. 1A
Fig. 1B

US 9,967,701 B1

PRESSURE SENSOR ASSISTED POSITION DETERMINATION

BACKGROUND

Mobile devices have traditionally included some form of position determination capability to assist users with navigational tasks and/or provide users with services that rely on geographic information. Mobile devices commonly use on-board Global Positioning System (GPS) receivers for fast and accurate position determination. However, mobile devices may rely on batteries having limited power storage capabilities, and GPS receivers can consume a relatively large amount of battery power during operation.

BRIEF DESCRIPTION OF THE DRAWINGS

FIGS. 1A and 1B are diagrams illustrating position and pressure values along a route traveled by a vehicle;

DETAILED DESCRIPTION OF THE PREFERRED EMBODIMENTS

Figure 2A:
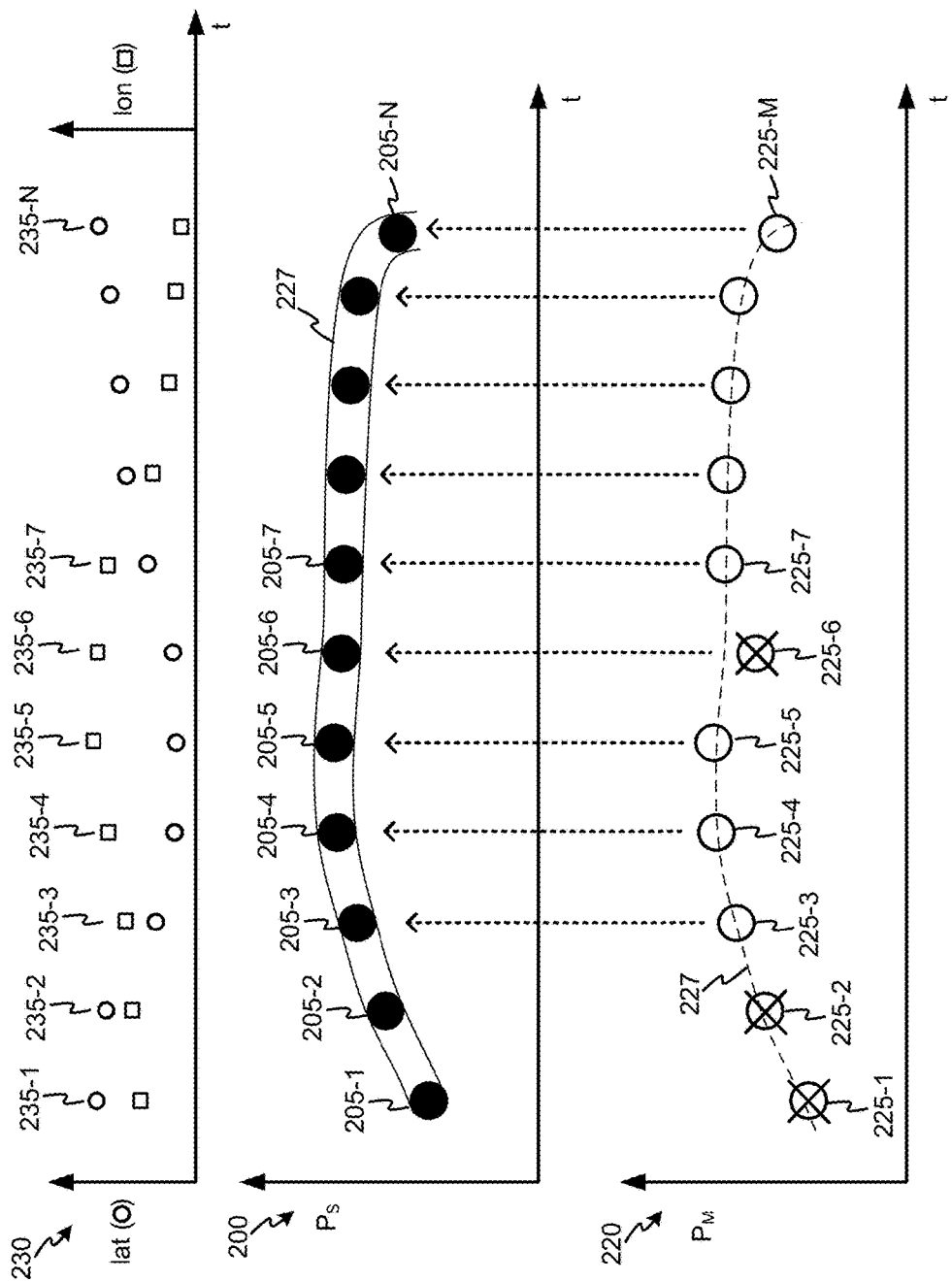
FIG. 2A is a diagram illustrating an exemplary approach for determining position values using associated pressure measurements.

The following detailed description refers to the accompanying drawings. The same reference numbers in different drawings may identify the same or similar elements. The following detailed description does not limit the invention.

Embodiments described herein are directed to a mobile device which may perform position estimates based upon barometric pressure measurements. In an embodiment, the mobile device, which may use sensors to collect position and pressure values from within a moving vehicle, can initially identify a set of stored position and pressure values which may correspond to a predefined route. The mobile device may then estimate a position value without using a Satellite Navigation System (SNS) by finding, within the previously identified set of stored position and pressure values, a stored pressure value being relatively close to a currently measured pressure value. Once such a stored pressure value is found, a stored position value may be associated with the found stored pressure value, where the stored position value serves as a position estimate of the mobile device. In some embodiments, the SNS receiver is deactivated to reduce power consumption while positions are determined based on pressure measurements as described herein. Because SNS receiver may consume a relatively large amount of power, the deactivation of the SNS receiver can improve the battery life of the mobile device. In another embodiment, if the SNS receiver is temporarily unable to determine a position fix because of poor signal reception (e.g., due to occlusion from structures such as tunnels or tall buildings, or natural coverage from tree canopies or mountains), embodiments may estimate position based on pressure measurements during the time that SNS-based positioning is unavailable.

FIGS. 1A and 1B are diagrams illustrating position and pressure values along an exemplary route traveled by a vehicle. FIG. 1A shows a map 105 having a conventional layout where latitude varies in the vertical dimension, and longitude varies on the horizontal dimension. In the example shown, the vehicle can trace out route 110, which begins at starting point 115, traverses primarily along highway 120, and terminates at ending point 125. The route may be characterized by a set of position values which represent the latitude and longitude of the vehicle at particular points in time. The positions for route 110 may be collected by a SNS receiver over the time period of the vehicle's travel. During the same time period, the vehicle (or the user device) may also measure pressure values along route 110 using, for example, a barometric pressure sensor. FIG. 1B shows graph 150 of the measured pressure values ($P_M$) as a function of sample number, which may be converted to time knowing the sampling rate of the pressure sensor used to make the pressure measurements. As shown in graph 150, the initial pressure value corresponds to the route at starting point 115, and the final pressure value corresponds to the ending point 125. As can be seen in plot 150, the variation in pressure along route 110 may be clearly delineated, and assuming there is sufficient relief in the terrain along route 110, the accuracy of the pressure measurement may be sufficient to track the height variations corresponding to the terrain relief along route 110. Accordingly, by using previously stored position and pressure values which have been collected by mobile devices and/or obtained from a networked device (e.g., a server), current measurements of pressure, determined by pressure sensor within a vehicle, may be obtained and used to determine (i.e., estimate) position values. Details describing an exemplary approach are provided below in relation to FIG. 2A.

FIG. 2A shows three plots for illustrating an exemplary approach for determining position values using associated pressure measurements. Plot 220 shows pressure measurements 225 (referred to plurally as "pressure measurements 225" and specifically as "pressure measurement 225-X" where X=1, . . . , M) taken along a vehicle's route 227 as a function of time (or in some embodiments, a function of distance). Pressure measurements 225 may also be referred to herein as "measured pressure values." In the embodiment shown in FIG. 2A, the measured pressure values 225 represent discrete pressure values. As used herein a "discrete pressure" measurement (also referred to herein as "discrete pressure values") may be based upon a single direct measurement from a pressure sensor. As will be described below in reference to FIG. 2B, differential pressure values derived from discrete pressure values may also be used in other embodiments. Further referring to FIG. 2A, in plot 220, the circles represent discrete pressure measurements, and "X's" represent position measurements (e.g., those determined by a SNS such as, for example, the Global Positioning System (GPS)). The pressure measurements 225 and the position measurements may be performed by a mobile device within the travelling vehicle.

Plot 200 represents a set of stored pressure values 205 (referred to plurally as "stored pressure values 205" and specifically as "stored pressure value 205-X" where X=1, . . . , N) that may act as reference pressure values and may be grouped as a set along a route. The stored pressure values 205 may represent discrete pressures obtained from individual measurements from a single mobile device, which may be taken over different time periods, along the route. Alternatively, stored pressure values 205 may represent discrete pressures measured from one or more devices taken at different times, which may be combined (e.g., averaged, filtered, etc.) and placed at predetermined positions along a route. Variations in sampling rates or phase of the pressure and/or position measurements may be corrected through resampling. In an embodiment, the pressures obtained from a plurality of different devices may be obtained through crowdsourcing. Correction values to compensate for variations in pressure (e.g., due to atmospheric variations, pressure sensor inaccuracies, etc.) may also be collected from a separate source (e.g., weather service) and received over a wireless network. The correction values may be geotagged (with latitude and longitude values) and collected on a per sample basis or over a number of samples, depending upon the resolution desired for the correction values.

Plot 230 represents a set of stored position values 235 (referred to plurally as "stored position values 235" and specifically as "stored position value 235-X" where X=1, . . . , N), that may act as reference position values and may be grouped as a set along a route. Stored position values 235 may represent a position in a standard reference system and include latitude values (shown by circles in plot 230) and longitude values (shown by squares in plot 230). Stored position values 235 and stored pressure values 205 may be sampled substantially at the same time, or appropriately processed (e.g., filtered, interpolated, etc.) to be made substantially coincident in time. While only one set of stored position and pressure values 235, 205 is shown, multiple sets may be stored for matching and subsequent use by a mobile device as will be described below. The stored position and pressure values 235, 205 may be determined previously by the mobile device itself and stored locally, and/or may be measurements provided by a network device (e.g., positioning server). Stored position and pressure values 235 and 205 may be based on crowdsourced data that has been obtained through other user devices and subsequently processed, compiled, and stored by the network device.

Further referring to FIG. 2A, in an embodiment where stored pressure values 205 represent discrete (i.e., not differential) pressure measurements, an example of determining a position based on discrete pressure values is described as follows. As shown in plot 220, as a vehicle drives along route 227, the mobile device may determine a pressure measurement 225-1 along with a first position measurement (indicated by the "X" at 225-1) in plot 220. It should be noted that the pressure measurements 225 and position measurements may be taken in a manner where they are substantially coincident (i.e., the measurements are taken approximately at the same time). Alternatively, pressure measurements 225 and the position measurements may be taken at different times (e.g., having a different sampling frequency and/or sample phasing) and be processed (e.g., filtered, interpolated, etc.) as if they were measured at substantially coincident manner.

The first position measurement taken at pressure measurement 225-1 may be a starting location, and used to determine an appropriate dataset having a matching position and pressure pair in the stored position values 235 and stored pressure values 205 (within a tolerance). Once the first position measurement is matched to a stored position measurement 235-1, the corresponding stored pressure measurement 205-1 is checked to see if there is a match to stored pressure value 225-1. If a match is identified, this process may be repeated again at pressure measurement 225-2 to verify stored position and pressure values 235-2, 205-2 appropriately match the vehicle's route 227. Once a matching set of stored position and pressure values 235, 205 are identified, the stored position and pressure values 235, 205 may be used to determine subsequent positions of the vehicle based on measured pressure values 225 alone, without the use of a SNS.

For example, pressure measurement 225-3 may be used to match (within a tolerance) a pressure value 205-3. The tolerances used for the pressure measurements may vary over time and/or geospatially, and be a function of the accuracy and/or performance of other systems and/or sensors. In an embodiment, the pressure tolerances may be dependent on the accuracy of the location values collected by the SNS (e.g., a tolerance defining acceptable pressure values may be proportional to the location accuracy of the SNS). Alternatively, based on stored pressure value 205-3, a corresponding stored position value 235-3 may be determined (e.g., looked-up) and be reported as an estimate of the position of the vehicle along route 227. This may be done for subsequent measured pressure values (e.g., 225-4 and 225-5), so that the SNS receiver in the mobile device may be deactivated (e.g., placed in sleep mode) to in order to save power. If an anomalous pressure measurement is determined as shown at 225-6 (e.g., pressure measurement exceeds a differential tolerance from a previous pressure measurement), the SNS receiver may be reactivated and a position measurement may be generated (as indicated by the "X" in plot 220 at pressure measurement 225-6) to verify the vehicle as not traveled off the route described by stored position and pressure values 235, 205. Once the identified dataset is confirmed (that is, stored position and pressure values 235, 205 still match route 227) the SNS receiver may again be deactivated, and subsequent pressure measurements 225-7 through 225-M may be used to determine the vehicle's position by matching pressure measurements 225 with stored pressure values 205, and estimating the position of the vehicle by based on matched stored position measurements 235. In another embodiment as will be described in more detail below, determining position values using associated pressure measurements may be based on using differential pressure values. In such an embodiment, adjacent differences of measured pressure values 225, determined along route 227, may be computed and compared to reference differential pressure values. The reference differential pressure values may be stored directly in stored pressure measurements 205, or may be computed for each desired position along route 227 from adjacent discrete stored pressure values 205 along path 227.

Figure 2B:
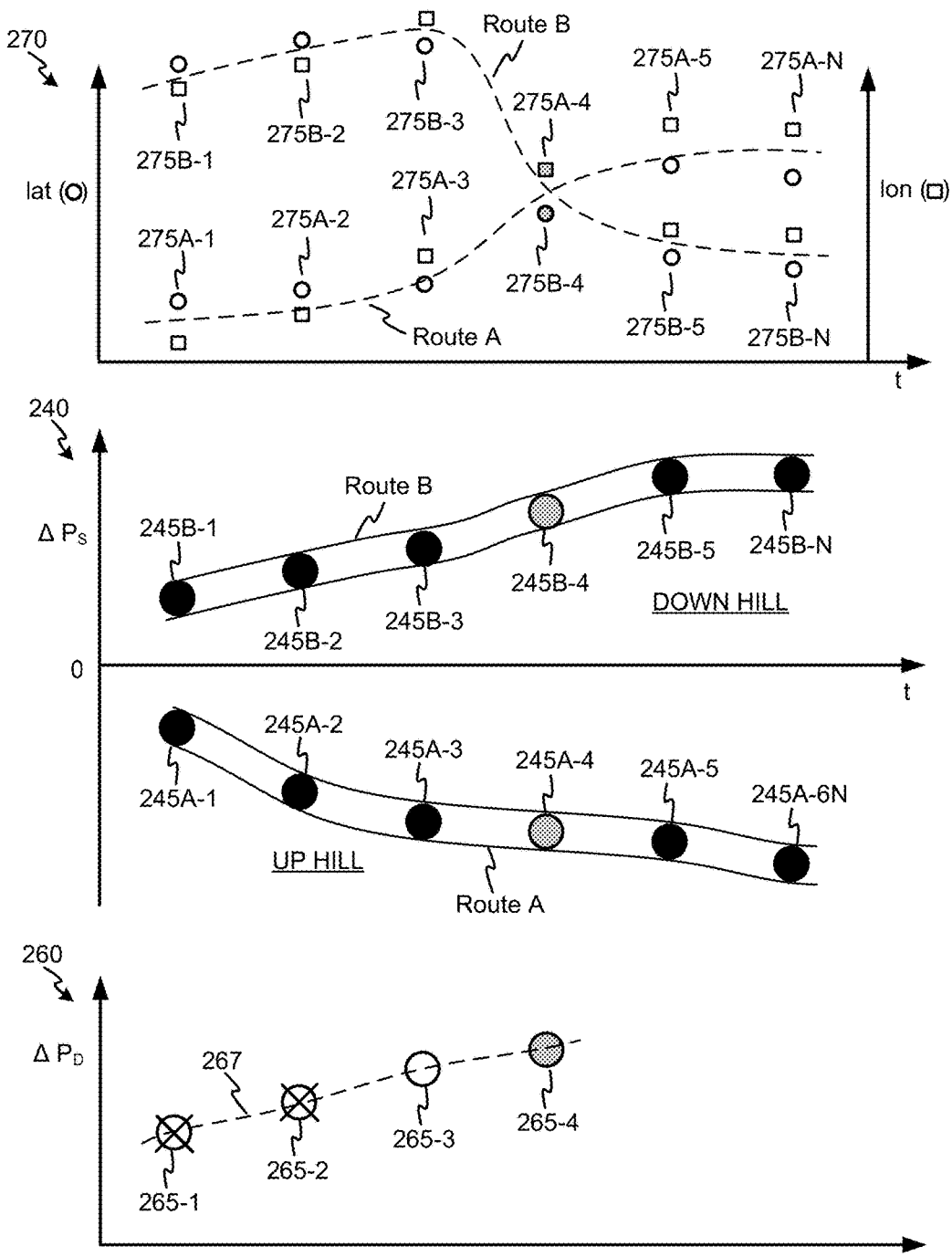
FIG. 2B is a diagram illustrating another exemplary approach for determining position values using associated differential pressure values.

FIG. 2B is a diagram illustrating another exemplary approach for determining position values using associated differential pressure values. Such embodiments may utilize differences in discrete pressure measurements to assist in the determination of position without the use, or with minimal assistance, of a SNS. In an embodiment, differential pressure values may be calculated from adjacent discrete pressure measurements along a route, and may be compared with stored pressure values to find a corresponding stored position value. In the embodiment described below, the stored pressures used in the comparison may be differential pressure values. However, in other embodiments, discrete pressures may be stored as noted above in FIG. 2A, which may subsequently be used to calculate the reference differential pressure values for comparison with the differential pressure measurements determined by a pressure sensor in a mobile device.

Further referring to FIG. 2B, plot 270 represents two sets of stored position values (in latitude and longitude) for two different routes, "Route A" and "Route B" over time (t). The stored position values for both routes may be referred to collectively as "stored position values 275." With reference to each route, the stored position values may be referred to as "stored position values 275A" for Route A, and "stored position values 275B" for Route B. Individually, positions may be referred to as "stored position value 275-X" for both routes. For individual values along a specific route, the stored positions may be referred to as "stored position value 275A-X" for Route A, and "stored position value 275B-X" for Route B, where X=1, . . . , N. Stored position values 275 may represent a position in a standard reference system and include latitude values (shown by circles in plot 270) and longitude values (shown by squares in plot 270). As can be seen in plot 270, Route A and Route B represent different routes which happen to cross at point 275-4 (shown as a shaded in plot 270), and thus have substantially the same values for latitude and longitude at the fourth point along both routes.

Plot 240 represents two sets of stored differential pressure values ($\Delta P_s$) for two different routes, "Route A" and "Route B" over time (t). The stored differential pressure values may represents the difference in pressure from spatially adjacent positions along a particular route. By using differential pressure, at least a significant portion of pressure variations due to atmospheric changes may be reduced, depending upon the spacing used to determine each differential pressure value. Alternatively, if differential pressures are being used to perform position determination, the reference differential pressures may be calculated directly from stored pressure values 205 which may represent discrete measurements. Such an approach may avoid the need to perform atmospheric corrections, and be simple to compute as the vehicle traverses along a route. The stored differential pressure values may act as reference differential pressures for a particular route and may correspond point-by-point to stored position values in plot 270 for each respective route. The stored differential pressure values for both routes may be referred to collectively as "stored differential pressure values 245." With reference to each route, the stored differential pressure values may be referred to as "stored differential pressure values 245A" for Route A, and "stored differential pressure values 245B" for Route B. Individually, differential pressure values may be referred to as "stored differential pressure value 245-X" for both routes, where X=1, . . . , N. For individual values along a specific route, the stored differential pressure values may be referred to as "stored differential pressure value 245A-X" for Route A, and "stored differential pressure value 245B-X" for Route B.

Further referring to plot 240, for Route A, the differential pressure values 245A are all negative, and trending downward over time, which indicates that Route A is traversing uphill (i.e., a discrete pressure for a given point is less than a discrete pressure for a preceding point encountered along the route). Given the shape of the curve defined by differential pressure values 245A, the pressures are successively decreasing, thus indicating that the steepness of terrain over Route A is increasing over the measured time period in Plot 240. For Route B, the differential pressures are all positive, and trending upward over time, which indicates that Route B is traversing downhill. Given the shape of the curve defined by differential pressure values 245B, the pressures are successively increasing, thus indicating that the steepness of terrain over Route B is decreasing over the measured period time shown in Plot 240. The point 245-4, which is shown as a lightly shaded circle, is the point of intersection of the two Routes A and B. Note that if Route A and Route B corresponded to diametrically opposed paths, the differential pressure value for point 245A-4 would have the same absolute value as the differential pressure value for point 245B-4, but have the opposite sign.

Stored differential pressure values 245 may be based on the differences of discrete pressures measured from one or more devices taken at different times, which may be combined (e.g., averaged, filtered, etc.) and placed at predetermined positions along a route. Variations in sampling rates or phase of the differential pressure and/or position values may be corrected through resampling. The need for such resampling may be diminished if the stored pressure and corresponding geographical, or position, information data (i.e., latitude and longitude coordinates) are acquired at locations close enough together spatially along a route so the that comparison to them with currently acquired pressure information from a mobile device that does not measure geographical information directly (i.e., its GPS radio is turned off) is minimized. Generally, accuracy error may be minimized if information used to determine stored pressure and corresponding location information is acquired at a frequency that is higher than a predetermined rate, and the mobile device that is measuring only pressure data, and then comparing same to the stored pressure values acquires pressure values at a higher rate than the rate at which the stored values were obtained. Meta data included with the stored pressure values may indicate the sample rate (or blended sample rate is crowdsourcing was used to create the data set of stored pressure and corresponding location information). In addition, when crowdsourcing is used to determine a data set of stored pressure and corresponding position/location information data, an aggregating platform may interpolate data from a plurality of sources according to time stamps obtained from, for example, corresponding streams of data that are acquired, transmitted, received, or processed according to National Marine Electronics Association (NMEA) specifications (i.e., GPS satellite data streams) that are used to compute the geographical coordinates used in the stored data set. A standardized precision may be used and data from different mobile devices that supply "crowdsourced" data may be "snapped" to an imaginary grid having longitude, latitude, and perhaps elevation spacing corresponding to an established precision. For example, if the crowdsourcing platform uses a precision of five meters, but a given data point sample from a mobile device that is participating in the crowdsourcing contribution reports a pressure at a location that falls between the predetermined "grid" spacing of five meters, the platform may "round down" the reported coordinates to the closest geographical latitude and or longitude coordinate(s) of the grid. Other rounding or interpolation may be used when generating stored pressure values that correspond to location information. In an embodiment, the differential pressures obtained from a plurality of different devices may be based on pressure measurements obtained through crowdsourcing. Correction values to compensate for variations in pressure (e.g., due to atmospheric variations, pressure sensor inaccuracies, etc.) may also be collected from a separate source (e.g., weather service) and received over a wireless network. The correction values may be geotagged (with latitude and longitude values) and collected on a per sample basis or over a number of samples, depending upon the resolution desired for the correction values.

Stored position values 275 and stored differential pressure values 245 may be sampled substantially at the same time, or appropriately processed (e.g., filtered, interpolated, etc.) to be made substantially coincident in time. While only two sets of stored position and differential pressure values 275, 245 are shown (corresponding to Route A and Route B), multiple sets may be stored for matching and subsequent use by a mobile device. The stored position and differential pressure values 275, 245 may be determined previously by the mobile device itself and stored locally, and/or may be measurements provided by a network device (e.g., positioning server). Stored position and differential pressure values 275 and 245 may be based on crowdsourced data that has been obtained through other user devices and subsequently processed, compiled, and stored by the network device.

Further referring to FIG. 2B, plot 260 shows differential pressure values ($\Delta P_D$) over time (t). Differential pressure values may be referred to plurally as "differential pressure values 265," and specifically as "differential pressure value 265-X" where X=1, . . . , M (where M=4 in Plot 260). Differential pressure values 265 may be determined along a vehicle's route 267 as a function of time. In an embodiment, each differential pressure measurement 265-X may calculated from two spatially adjacent discrete pressure measurements as the vehicle drives along route 267. For example, as shown in Plot 260, the current differential pressure value 265-4 may be determined by having mobile device calculate a difference between a discrete pressure values (not shown) at the locations of samples 265-4 and 265-3. The selection of which pressure measurement to use as the second value to compute a difference may be a function of, for example, the direction of the vehicle along route 227, and/or how the stored differential pressure values were computed. In other embodiments, differential pressure values 265 may be computed using more than two samples by using algorithms to more accurately determine the difference, reduce noise, and/or better mitigate the effects of varying atmospheric pressure.

In regards to embodiments based on using differential pressure values described herein, regardless of the particular computation, the determined differential pressure value associated with a particular pressure value difference will be termed "differential pressure value 225-x" for ease of description. For embodiments which identify a set of stored position and pressure measurements 275, 245 with the help of the SNS within the mobile device, for example, as described above in FIG. 2A, the differential pressure values 225 and position measurements (which are not shown in FIG. 2B) may be taken in a manner where they are substantially coincident. Alternatively, differential pressure values 225 and position measurements may be taken at different times (e.g., having a different sampling frequency and/or sample phasing) and be processed (e.g., filtered, interpolated, etc.) as if they were measured at substantially coincident manner. In other embodiments, pressures variations instead of differential pressure values may be calculated from discrete pressure measurements in different ways, for example, a pressure variation or derivative may be determined based on a plurality of weighted discrete pressure values to, for example, improve accuracy and/or reduce noise.

Further referring to FIG. 2B, in an embodiment, a position of a vehicle based on current differential pressure values value 267-4 may be estimated by initially determining a matching data set in stored position and differential pressure values 275, 245. Once the appropriate set of stored position and differential pressure values are identified for the route (e.g., Route A or Route B as shown in Plot 240) which most closely matches vehicle route 267. Identifying the appropriate set of position and differential pressure values may be performed in a variety of different ways.

One exemplary approach to determine a matching set of stored position and pressure values 275, 245 may be determined by analyzing one or more differential pressure values (e.g., 265-1, 265-2, and/or 265-3) determined prior to the current differential pressure value 265-4. This matching approach may be performed because the relative changes between the differential pressure values 265 from one point to the next along a route may be sufficiently unique for matching the travelled route 267 with one of the stored routes corresponding to the stored position and pressure values 275, 245. Utilizing only one differential pressure value (or one discrete pressure value) without supplemental information (e.g., coincident position information generated by the SNS receiver) may be unable to uniquely identify a location or heading of the vehicle. However, by utilizing prior histories of differential pressure values (e.g., three points or more), a matching set of stored position and pressure values 275, 245 may be determined for the vehicle's route 267 with a reasonable degree of confidence.

Accordingly, for the example shown in FIG. 2B, differential pressure values 265-1 through 265-4 may be used to determine a match in stored differential pressure values 245. In one embodiment, comparisons may be made point by point between the differential pressure values 265 acquired by the vehicle with the stored differential pressures 245. Differences between the acquired and stored values may also be compared to match changes in differential pressure. Any appropriate matching technique may be used to match the route, which may include, for example, correlations, trend matching algorithms, pattern matching algorithms, least squares techniques, etc. As can be seen in FIG. 2B, both the trend of differential values, and the actual differential pressure values themselves, of the vehicle's route 267 more closely match the stored differential pressure values 245B-1 corresponding to Route B. The location of the vehicle may now be determined by looking up the position value corresponding to stored differential pressure value 245B-4, which is stored position value 275B-4 corresponding to Route B. In this case, this point happens to be the intersection of two routes. Note such an intersection does not cause an ambiguity when using differential pressure values, as the directionality of the route (e.g., traversing uphill or downhill) will sufficiently distinguish between the pressure values at least by a difference in sign, as can clearly be seen in Plot 240 for stored pressure values 245A-4 and 245B-4. The retrieved stored position value 275B-4 may be used as a position estimate for the vehicle as a substitute for a position value provided by the SNS receiver, thus saving power by permitting deactivation of the SNS receiver.

Another exemplary approach to determine a matching set of stored position and pressure values 275, 245 may be accomplished by determining a position value using the SNS receiver which is coincident to any differential pressure value 267-X, and subsequently perform a matching based on stored location values in a manner analogous to what is done with the measured discrete pressure values explained above in reference to FIG. 2A. An exemplary approach based on acquired differential pressure measurements is provided below.

The first position measurement taken at differential pressure value 265-1 (as indicated by the "X" marker in Plot 260 at differential pressure value 265-1) may be a starting location, and used to determine an appropriate dataset having a matching position and pressure pair in the stored position values 275 and stored differential pressure values 245 (within a tolerance). Once the first position measurement is matched to a stored position measurement 275B-1, the corresponding stored differential pressure value 245B-1 may be checked to see if there is a match to the differential pressure value 265-1. If a match is identified, this process may be repeated again at differential pressure value 265-2, which also includes an "X" marker to indicate another position by the SNS receiver may be determined, to verify stored position and differential pressure values 275B-2, 245B-2 appropriately match the vehicle's route 267. Once a matching set of stored position and differential pressure values 275B, 245B are identified, the stored position and differential pressure values 275B, 245B may be used to determine subsequent positions of the vehicle based on measured differential pressure values 265 alone, without the use of a SNS.

For example, differential pressure value 265-3 may be used to match (within a tolerance) a stored differential pressure value 245B-3. The tolerances used for the pressure measurements may vary over time, and be a function of the accuracy and/or performance of other systems and/or sensors. In an embodiment, the pressure tolerances may be dependent on the accuracy of the location values collected by the SNS (e.g., a tolerance defining acceptable pressure values may be proportional to the location accuracy of the stored SNS data). Alternatively, based on stored differential pressure value 265-3, a corresponding stored position value 275B-3 may be determined (e.g., looked-up) and be reported as an estimate of the position of the vehicle along route 267. This may be done for subsequent measured differential pressure 265B-4 and afterwards, so that the SNS receiver in the mobile device may be deactivated (e.g., placed in sleep mode) to in order to save power. If an anomalous differential pressure value is determined, the SNS receiver may be reactivated and a position measurement may be generated to verify the vehicle has not traveled off the route described by stored position and differential pressure values 275, 245. Once the identified dataset is confirmed (that is, stored position and differential pressure values 275, 245 still match route 267) the SNS receiver may again be deactivated, and subsequent differential pressure values may be used to determine the vehicle's position by matching differential pressure values 265 with stored differential pressure values 245, and estimating the position of the vehicle by based on matched stored position measurements 275.

Additionally, in other embodiments, combinations of techniques provided above for determining the set of position and pressure values 275, 245 which most closely match the route 267 of the vehicle may be used.

Measured position values may be determined by an onboard SNS receiver, and may described in a standard reference system (e.g., WGS 84 as used in the Global Positioning System (GPS)) and may further include time tags in a standard time reference. The position values may further include altitude values to describe positions in three dimensions (e.g., latitude (lat.), longitude (lon.), altitude (alt.)). In some instances, only two-dimensional positions may be used (e.g., lat., lon.). Alternatively, positions may be described by using rectangular coordinates in a common reference frame (WGS-84).

As will be described in more detail below, the mobile device may include any type of electronic device having communication capabilities, and thus communicate over a network using one or more different channels, including both wired and wireless connections. The mobile device may be fixed within the vehicle (e.g., such as, for example, an in-dash unit) or may be a separate unit that may be removably attached to the vehicle (e.g., a cell phone attached by a cradle). The vehicle as noted above may be any type vehicle, and may be any type of land vehicle (e.g., a truck, van, sport utility, motorcycle, etc.), motorized watercraft (e.g., recreational boats), or small aircraft (either manned or unmanned, such as a drone). Alternatively, embodiments presented herein may be used to assist in the guidance of, and/or automatically route, an autonomous or self-driving vehicle.

Figure 3:
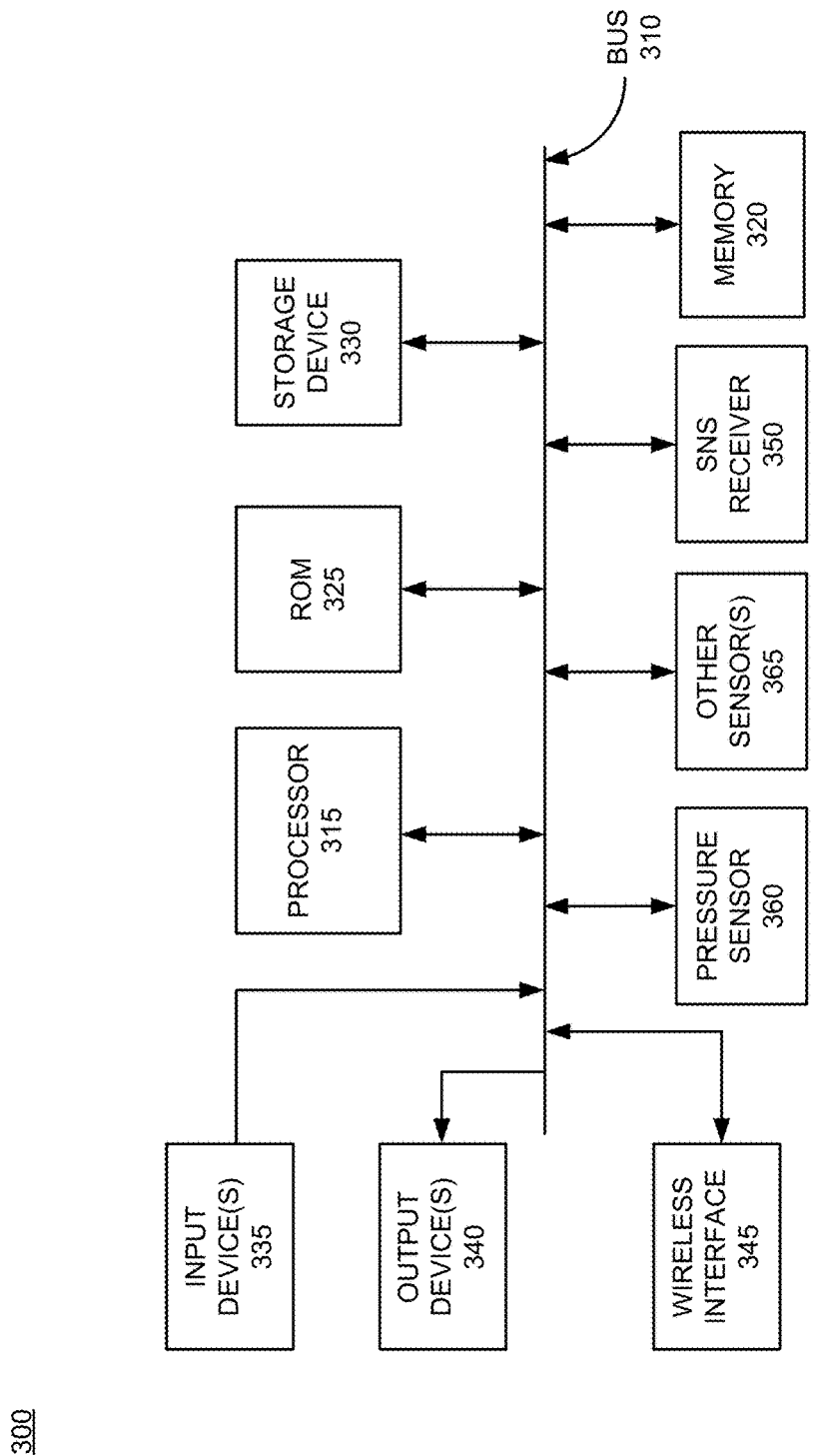
FIG. 3 is a block diagram showing exemplary components of a mobile device according to an embodiment.

FIG. 3 is a block diagram showing exemplary components of a mobile device 300 according to an embodiment. Mobile device 300 may be any type of electronic device having communication and geo-positioning capabilities, and may include a bus 310, a processor 315, memory 320, a read only memory (ROM) 325, a storage device 330, one or more input device(s) 335, one or more output device(s) 340, a wireless interface 345, a Satellite Navigation System (SNS) receiver 350, a pressure sensor 360, and other sensor(s) 365. Bus 310 may include a path that permits communication among the elements of mobile device 300.

Mobile device 300 can communicate over a network using one or more different channels, including wired and/or wireless connections. Mobile device 300 may include, for example, a cellular mobile phone, a smart phone, a tablet, a wearable computer (e.g., a smartwatch, glasses, etc.), any type of Internet Protocol (IP) communications device, a laptop computer, a palmtop computer, a media player device, or a digital camera that includes communication capabilities (e.g., wireless communication mechanisms). Mobile device 300 may be used within a vehicle, and could include an in-vehicle navigation system which may include a head unit for user interaction and control.

Processor 315 may include a processor, microprocessor, or processing logic that may interpret and execute instructions. Memory 320 may include a random access memory (RAM) or another type of dynamic storage device that may store information and instructions for execution by processor 315. ROM 325 may include a ROM device or another type of static storage device that may store static information and instructions for use by processor 315. Storage device 330 may include a magnetic and/or optical recording medium and its corresponding drive.

Input device(s) 335 may include one or more mechanisms that permit an operator to input information to mobile device 300, such as, for example, a keypad or a keyboard, a microphone, voice recognition, a touchscreen, a biometric mechanism, etc. Output device(s) 340 may include one or more mechanisms that output information to the operator, including a display, a speaker, etc. In some embodiments, such as, for example, where mobile device 300 is installed in a drone, or an autonomous self-driving vehicle, input device(s) 335 and/or output device(s) 340 may not be included during operation. In such embodiments, input device(s) 335 and/or output device(s) 340 may be removably coupled to bus 310 and used only during service of the drone or autonomous self-driving vehicle.

Wireless interface 345 may include any transceiver mechanism that enables mobile device 300 to communicate with other devices and/or systems. For example, wireless interface 345 may include mechanisms for communicating with another device or system via a network, which may include a Wide Area Network (WAN), a Local Area Network (LAN), and/or a Personal Area Network (PAN). Wireless Interface 345 may be supported by any cellular radio access network (RAN), such as, for example, those using CDMA-based protocols, TDMA based protocols, and/or a Long Term Evolution (LTE) protocols. In other embodiments, the wireless channels may be supported by a local or wide area wireless network. A local area wireless network may include any type of Wi-Fi (e.g., any IEEE 801.11x network, where x=a, b, c, g, n and/or AC). A wide area wireless network may include any type wireless network covering larger areas, and may include a mesh network (e.g., IEEE 801.11s) and/or or a WiMAX IEEE 802.16. Wireless interface 345 may also be compatible with Bluetooth, Bluetooth LE, and/or any other PAN protocol.

SNS receiver 350 may be any system that provides position data in an absolute reference (e.g., a receiver providing position data in the WGS-84 system) and/or relative reference(s) (e.g., accelerometers). When deriving positions, SNS receiver 350 may utilize a receiver specifically designed for use with the SNS that extracts position, using conventional techniques, from a plurality of signals transmitted by SNS satellites. Various SNSs may be used, which typically include a system of transmitters positioned to enable mobile device 300 to determine its location based on signals received from the transmitters. In a particular example, such transmitters may be located on Earth orbiting satellites. For example, a satellite in a constellation of Global Navigation System (GNS) such as Global Positioning System (GPS), Galileo, or Glonass may transmit a signal marked with a Pseudorandom Noise (PN) code that may be distinguishable from PN codes transmitted by other satellites in the constellation. Further, the SNS receiver 350 may collect signal strength that indicates the location accuracy of the position data. Alternatively, accuracy measurements which may be provided by the SNS receiver 350 may be used to estimate the accuracy of position data (e.g., Geometric Dilution of Position (GDOP), Horizontal DOP (HDOP), Vertical DOP (VDOP), etc.).

Pressure sensor 360 may be any type of transducer that can measure pressure associated with the atmosphere. Pressure sensor 360 may measure a barometric pressure, and may provide a direct pressure measurement, or a relative pressure measurement (e.g., a gauge sensor). In some embodiments, pressure sensor 360 may be a sealed pressure sensor measuring pressure to a fixed reference. Additionally, pressure sensor 360, in conjunction with processor 315, may calculate differential pressure from sample-to-sample using a multiple measurements of barometric pressure. In some embodiments, measured pressure values may be corrected for weather variations by processor 315 based on, for example, weather updates received over wireless interface 345 and/or other ground truth data (e.g., Light Detection and Ranging (Lidar) data). Alternatively, multiple datasets may be stored based on various weather conditions. In an embodiment, time, date, and/or weather information (e.g., barometric pressure(s) (which may be recorded dynamically), temperature, humidity, precipitation, etc.), ground truth information, may be stored by the mobile device, in additional to storing position and pressure measurements, which may be stored for future use by the mobile device itself, and/or when uploaded for use in crowdsourcing applications.

Pressure sensor 360 may collect or determine a pressure accuracy that defines the reliability of the pressure measurement. For example, mobile device 300 may automatically, or manually at the discretion of the user, enter a calibration mode to define or at least bound the accuracy of the pressure measurements. Such calibration modes may include accessing elevation ground truth data and/or reference barometric pressure data via a wireless network in one or more locations which may be compared with one or more pressure values measured by the pressure sensor 360. The comparison may include algorithms to perform calibration, and may further include differential analysis of multiple locations. The calibration mode(s) thus may be used to remove pressure sensor 360 biases for improving performance and/or determining pressure sensor 360 accuracy.

Other sensor(s) 365 may be used to collect supplemental information to assist pressure sensor 360 and/or SNS receiver 350 to improve and/or better describe their measurement accuracies. Accordingly, the supplemental information may include data generated from other sensors that may, after processing by processor 315, further define or refine the pressure data and/or the SNS data collected by mobile device 300. Furthermore, other sensor(s) 365 may collect data to provide supplemental information to refine location in the event that SNS receiver 350 is unable to provide position data. In other embodiments, other sensors(s) 365 may be used instead of pressure sensor 360 to estimate variations altitude for conversion to variations in pressure (e.g., determine a "derived pressure" value), which may subsequently be used to correlate with stored position and pressure values 235, 205. Accordingly, the derived pressure value may be used to look up position values using stored position and pressure values 235, 205.

Other sensors 365 may include one or more accelerometer, such as, for example, a three-axes accelerometer, which may provide acceleration data that may be integrated into three-dimensional position data. By integrating accelerations in the vertical dimension (i.e., the axis associated with gravity), changes in height may be estimated to refine and/or supplement (i.e., to improve resolution) pressure values measured by pressure sensor 360. Deviations away from the axis associated with gravity may be used to define an incident angle associated with the amount of elevation change over the course of a time period. In another embodiment, an accelerometer may assist pressure sensor 360 by determining the distance traveled between pressure reading samples. Alternatively or additionally, gyroscopes may be used to calibrate the accelerometer to compensate for roll, pitch, and yaw variations incurred as the vehicle travels. For example, to ensure the accelerometer properly integrated vertical accelerations into height variations, roll and pitch data may be employed, depending upon where the accelerometer was mounted. Gyroscopes may also be used to directly determine variations in incline angle in order to estimate height and/or pressure deviations. In another embodiment, data provided by accelerometer(s) and/or gyroscope(s) may be used to refine and/or update the vehicle location when the resolution and/or accuracy of positions derived from pressure sensor measurements or the SNS receiver 350 are insufficient. For example, when the vehicle changes lanes on a multi-lane road, the accelerometer(s)

and/or the gyroscope(s) may provide additional information which can be used to detect and measure the lane change. This additional information may then be used to update the vehicle's navigation display to reflect the change, even if the SNS receiver 350 and/or the pressure derived positions lack the resolution to detect the lane change. In addition to accelerometers and/or gyroscopes, other transducers may be used to predict the RPM of the engine based on engine noise to estimate the speed of the vehicle over time.

Distance measuring sensors, such as odometers or other tire rotation sensors (which may measure the rotations (including fractional rotations) of one or more tires based on reported "tick" values) may be used in conjunction with gyroscopes to use "dead reckoning" assist pressure sensor 360 and/or SNS receiver 350 to improve and/or better describe their measurement accuracies. Dead reckoning may be useful when SNS receiver 350 information is unavailable or inactivated to conserver power.

Alternatively or additionally, accelerometers, speedometers, odometers, and/or tire rotation sensors may be used to determine and/or vary the sampling rates of SNS receiver 350, pressure sensor 360, and/or other sensor(s) 365. For example, as the speed of the vehicle varies, the sampling rate of pressure sensor 360 may be vary in a proportional manner (e.g., increasing sampling rate as speed increases). Additionally or alternatively, the sampling rates may be based on accelerometer data, where the sample rates can vary in a manner proportional to the magnitude of the acceleration. For example, if an accelerometer indicates larger accelerations in the vertical dimension, the sampling rates of pressure sensor 360 may be proportionally increased. If accelerometers readings in horizontal dimensions increase, then the sampling rates of the SNS receiver (when operating), or other sensor(s) 350, may be proportionally increased. Accordingly, by varying the sampling rates of pressure sensor 360, SNS receiver 350, and/or other sensor(s) 365 based on distance, velocity, and/or acceleration, the sampling rate may vary with the spatial characteristics of the terrain being traversed. In other words, "spatial sampling" may be performed by pressure sensor 360, SNS receiver 350, and/or other sensor(s) 365 instead of simply temporal sampling. Performing spatial sampling may be more desirable as variations in terrain can occur rapidly (e.g., over hills, mountains, switchbacks, etc.) where temporal sampling at a particular constant rate may not be sufficient to capture variations in terrain.

When sampling at a constant temporal sampling rate, mobile device 300 is sampling position and/or pressure values at different spatial sampling rates when the vehicle associated with mobile device 300 travels at different speeds, and. For example, when a vehicle is traveling slowly, the spatial sampling rate is finer (i.e., larger number of samples per unit distance). Alternatively, when a vehicle is traveling faster, the spatial sampling rate is coarser (i.e., smaller number of samples per unit distance). In other embodiments, the temporal sampling rates used by mobile devices 300 may be varied so that the position and pressure values are acquired using a constant spatial sampling rate (e.g., the distance between samples remains constant as the speed of the vehicle varies). Accordingly, when the vehicle slows down, the temporal sampling rate of position and pressure may be reduced to maintain a constant distance between samples. When the vehicle increases speed, the temporal sampling rate of the position and pressure values increases to maintain the constant distance between samples.

The discussion provided above describing sampling rates relates to the acquisition of position and pressure values by a mobile device.

Embodiments provided herein are also directed to storing reference position and pressure values 235, 205 for future use by mobile device 300. The stored position and pressure values 235, 205 may be collected by one or more mobile devices 300 in a crowdsourced manner, and thus may be acquired using different sampling rates which may be constant or may vary with time (i.e., constant spatial sampling may be performed which can change with velocity as noted above). Thus, in order to easily use the stored position and pressure values 235, 205 as a reference for any mobile device 300 using any temporal or spatial sampling rate, the stored position and pressure values 235, 205 can be resampled so they are stored at fixed distances along a route which are known to mobile devices 300 receiving the data.

In other embodiments, other sensor(s) 365 may include complex sensors such as Lidar and/or radar to sense objects based on previously recorded location data to estimate current location. These complex sensors may also refer to other reference data sets (e.g., ground truth data) in order to estimate and/or refine the current position of the vehicle.

In other embodiments, various wireless communication technologies may be used to estimate the position of the vehicle in addition to, or alternatively, to SNS receiver 320. For example, wireless interface 345 may be used to estimate the vehicle location based on cell tower positioning, which may include cell tower identification or cell tower trilateration. Cell tower identification typically provides a crude estimate of position, where cell tower trilateration is more accurate than cell tower identification. In either case, cell tower positioning may provide a coarser estimate than SNS receiver 320. Accordingly, when associating stored position and pressure values 235, 204, using cell tower positions, more than one pressure value may be considered (e.g., averaging may be performed) to determine an association between position and pressure when identifying a set of stored position and pressure values corresponding to the measured position and pressure values. Additionally, when performing the aforementioned identifying, mobile device 300 may store a history of previously measured pressure values to "pattern match" pressure trends to compensate for the inaccuracies of cell tower positioning. Additionally or alternatively, wireless interface 345 may also determine position based on WiFi signals, where particular wireless access points are geocoded in a database on, for example, a server which may be accessed by mobile device 300. Multiple wireless access points may be used to determine position, or refine positions determined by cell tower positioning. Additionally, or alternatively, wireless technologies such as Bluetooth LE may be used to determine positions based on Bluetooth beacons (e.g., iBeacon technology) which may perform position determination in close proximity to a vehicle. If various wireless positioning technologies are available, a tiered approach may be implemented, where the least accurate method may be initially used, and be subsequently refined my more accurate techniques. For example, cell tower identification may initially determine a first position estimate of the vehicle, and subsequently WiFi positioning may be used to refine the first position estimate, where the first position estimate may be used as a starting point for the WiFi positioning approach.

Mobile device 300 may perform certain operations or processes, as may be described in detail below. Mobile device 300 may perform these operations in response to processor 315 executing software instructions contained in a computer-readable medium, such as memory 320, ROM 325, and/or storage device 330. A computer-readable medium may be defined as a physical or logical memory device. A logical memory device may include memory space within a single physical memory device or spread across multiple physical memory devices. The software instructions may be read into memory 320 from another computer-readable medium, such as storage device 330, or from another device via wireless interface 345. The software instructions contained in memory 320 may cause processor 315 to perform operations or processes that will be described in detail with respect to FIGS. 5A-7. Alternatively, hardwired circuitry may be used in place of or in combination with software instructions to implement processes consistent with the principles of the embodiments. For example, the processes described below may execute at the operating system level and/or firmware level, which may save power. For example, the processes may be executed in a state machine in firmware on mobile device 300. Thus, exemplary implementations are not limited to any specific combination of hardware circuitry and software. The configuration of components of mobile device 300 illustrated in FIG. 3 is for illustrative purposes only. It should be understood that other configurations may be implemented. Therefore, mobile device 300 may include additional, fewer and/or different components than those depicted in FIG. 3.

Figure 4:
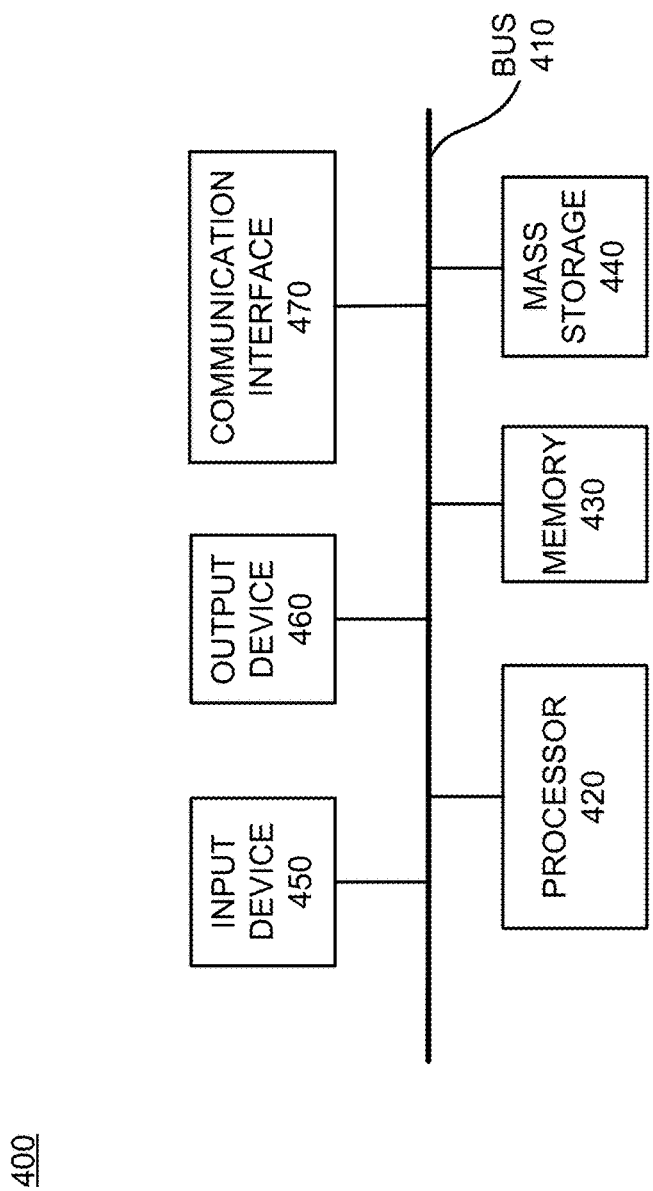
FIG. 4 is a block diagram showing exemplary components of a network device which may crowdsource position and pressure values.

FIG. 4 is a block diagram showing exemplary components of a network device 400. Network device 400 may provide stored position and pressure values 235, 205 to mobile device 300. As will be described in reference to FIGS. 8A and 8B, network device 400 may collect and process crowdsourced data (which may be provided by other mobile devices) to create and maintain a database of stored position and pressure values 235, 205. Network device 400 may include a bus 410, a processor 420, a memory 430, mass storage 440, an input device 450, an output device 460, and a communication interface 470.

Bus 410 includes a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux. Processor 420 may also use high-level analysis software packages and/or custom software written in any programming and/or scripting languages for interacting with other network entities.

Memory 430 may include any type of dynamic storage device that may store information and/or instructions, for execution by processor 420, and/or any type of non-volatile storage device that may store information for use by processor 420. For example, memory 430 may include a RAM or another type of dynamic storage device, a ROM device or another type of static storage device, and/or a removable form of memory, such as a flash memory. Mass storage device 440 may include any type of on-board device suitable for storing large amounts of data, and may include one or more hard drives, solid state drives, and/or various types of Redundant Array of Independent Disk (RAID) arrays.

Input device 450, which may be optional, can allow an operator to input information into network device 400, if required. Input device 450 may include, for example, a keyboard, a mouse, a pen, a microphone, a remote control, an audio capture device, an image and/or video capture device, a touch-screen display, and/or another type of input device. In some embodiments, network device 400 may be managed remotely and may not include input device 450. Output device 460 may output information to an operator of network device 400. Output device 460 may include a display (such as a Liquid Crystal Display (LCD)), a printer, a speaker, and/or another type of output device. In some embodiments, network device 400 may be managed remotely and may not include output device 460.

Communication interface 470 may include a logical component that includes input and/or output ports, input and/or output systems, and/or other input and output components that facilitate the transmission of data to other devices. For example, communication interface 470 may include a network interface card (e.g., Ethernet card) for wired communications and/or a wireless network interface (e.g., a Wi-Fi) card for wireless communications. Communication interface 470 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form. Communication interface 470 may further include one or more Radio Frequency (RF) transceivers that enable communications with mobile device(s) 300 via a wireless network. An RF transceiver may include an RF transmitter that receives signals to be transmitted wirelessly and performs signal processing on the signals before providing the signals to an antenna assembly (not shown), and an RF receiver (not shown) that receives signals from the antenna assembly and performs signal processing on the received signals before providing the received signals to processor 420. For example, the RF transceiver may perform analog-to-digital and digital-to-analog conversion, modulation and demodulation, up-conversion and down-conversion, and/or amplification of signals.

As described below, network device 400 may perform certain operations relating to the storage, processing, and/or distribution data sets which include stored position and pressure values 235, 205. Network device 400 may perform these operations in response to processor 420 executing software instructions contained in a computer-readable medium, such as memory 430 and/or mass storage 440. The software instructions may be read into memory 430 from another computer-readable medium or from another device. The software instructions contained in memory 430 may cause processor 420 to perform processes described herein, such as, for example, process 800A depicted in FIG. 8A. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of network device 400, in other implementations, network device 400 may include fewer components, different components, additional components, or differently arranged components than depicted in FIG. 4.

Figure 5:
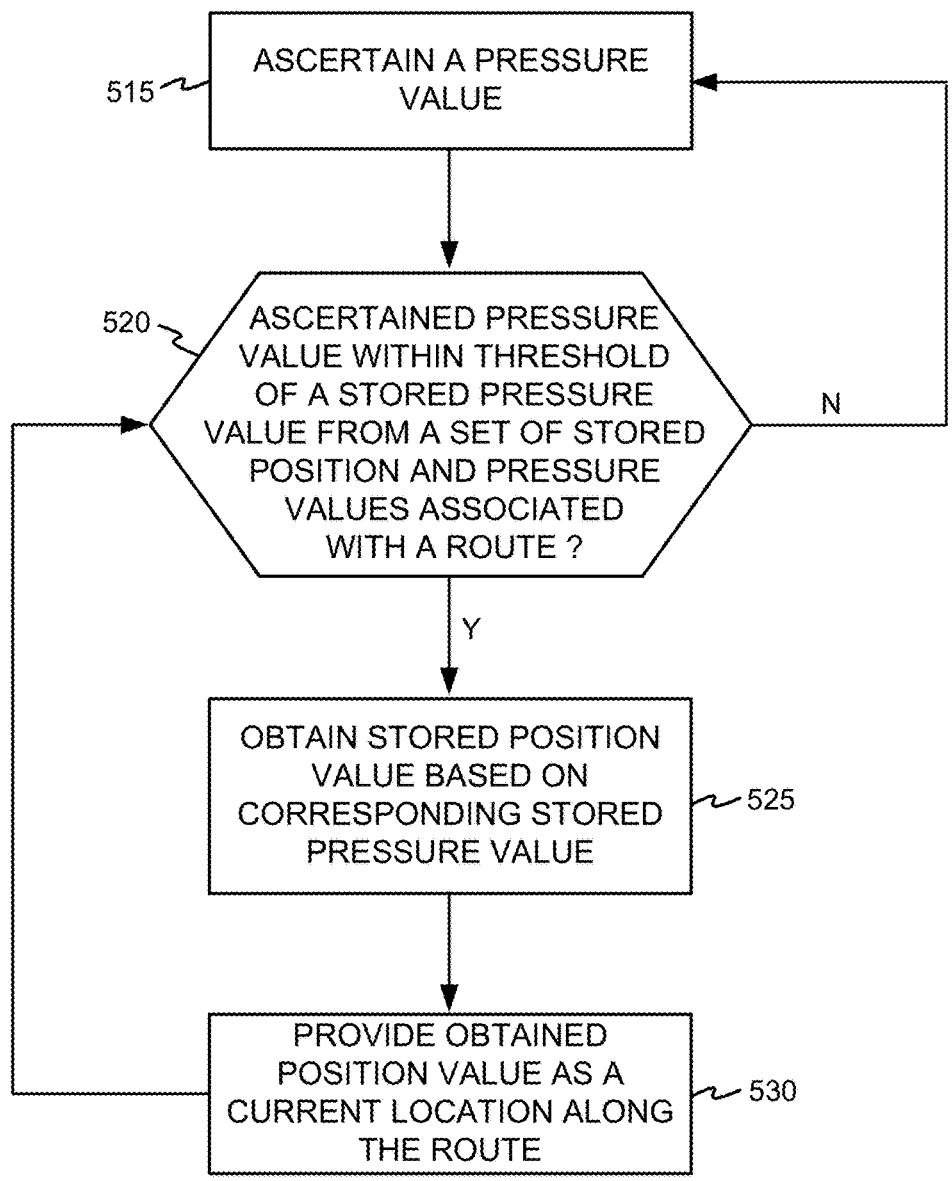
FIG. 5 is a flow chart showing an exemplary process for determining position values based on pressure values which permit the deactivation of a Satellite Navigation System (SNS) receiver.

FIG. 5 is a flow chart showing an exemplary process 500 for determining position values based on pressure values thereby permitting the deactivation of a Satellite Navigation System (SNS) receiver. Process 500 may be performed by mobile device 300, for example, by executing instructions on processor 315. Alternatively, process 500, or portions thereof, may be implemented in hardware/firmware of mobile device 300.

In an embodiment, processor 315 may ascertain a pressure value based on measurements performed by pressure sensor 360 (Block 515). The ascertained pressure may be determined by having processor 315 calculate differences in pressures taken from at least two discrete pressure measurements. For example, the ascertained pressure may include a differential pressure, which may be the difference in two spatially adjacent discrete pressure values. Details of an exemplary embodiment utilizing differential pressure values are provided below in relation to the description of FIG. 6A. In another embodiment, the ascertained pressure may be a based on discrete pressure value determined from a single direct measurement from pressure sensor 360, such as, for example, a measurement from a barometric pressure sensor. Additionally, the ascertained pressure may further include having processor 315 further refine the discrete pressure value by compensating for weather conditions and/or making corrections based on other independent reference data (e.g., ground truth data such as Light Detection and Ranging (Lidar) elevation data) and/or calibration data, if available. For example, if the accuracy and/or linearity of pressure sensor 360 changes based on various parameters (e.g., temperature, humidity, altitude, etc.) calibration corrections may be applied. If ground truth data (such as, for example, independent measurements of position and/or height determined by other methods/sensors) is available from other independent sources, it can be provided to processor 315 and be used to make corrections.

Further referring to FIG. 5, once the pressure value 520 is ascertained in Block 515, processor 315 may determine whether the ascertained pressure value is within a threshold of a stored pressure value from a set of stored position and pressure values associated with a route (Block 520). If differential pressure values are being used, details of an embodiment for Block 520 are presented below in the description of FIG. 6A. Processor 315 may then obtain a stored position value, from the set of stored position and pressure values, which is associated with the stored pressure value, in response to determining that the stored pressure value is within the first threshold of the ascertained pressure value (Block 525). Subsequently, processor 315 may provide the stored position value as current a location along the route (Block 530). Processor 315 may loop back to Block 520 to ascertain the next pressure value as the vehicle moves along route 227.

In another embodiment, if the ascertained pressure value is not within the threshold (i.e., the pressure value changed significantly) in Block 520, processor 315 may ascertain at least one additional pressure value. Processor 315 may then determine whether differences between the additional ascertained pressure values are below another threshold. In an embodiment, processor 315 may determine if the vehicle's route has changed or the existing route needs to be verified, in response to determining that differences between the additional ascertained pressure values (which may be differential pressure values) are outside another threshold. Thresholds used in Block 520 may differ and be dependent on sensor information, or the location accuracy of the SNS.

In another embodiment, processor 315 may monitor the status of SNS receiver 350 and use pressure based measurements to determine position as illustrated in process 500 when SNS receiver 350 cannot generate position values. Such conditions may occur when the satellite signal is obscured by man-made structures such as, for example, buildings, tunnels, etc., or obscured by natural cover such as trees. Accordingly, processor 315 may determine when SNS receiver 350 is unable provide position values. Upon making such a determination, processor 315 may designate a last known position value as a current position value for the identifying a set of stored position and pressure values. Subsequent position values may be determined using process 500 based on ascertaining the pressure using pressure sensor 360.

In another embodiment, processor 315 may ascertain at least one additional pressure value, and then obtain at least one additional stored position value based on the at least one pressure value. Processor 315 may then determine a velocity based upon differences between the at least one additional stored position value and the stored position value, and a sampling rate of the discrete pressure value.

In another embodiment, variations in the pressure value measurements by pressure sensor 360 may be used to differentiate between route ambiguities and/or errors in position generated by SNS system 350. For example, changes in pressure may be used to determine when a vehicle proceeds along an exit ramp to exit a highway, instead of continuing along the highway. Using height variations caused by traversing along an exit ramp may be used to distinguish between the exit ramp and the highway when the SNS receiver 350 is unable to do so, which can reduce the occurrences of the SNS incorrectly choosing, or reporting, the location or route information when the vehicle takes the exit ramp.

Figure 6A:
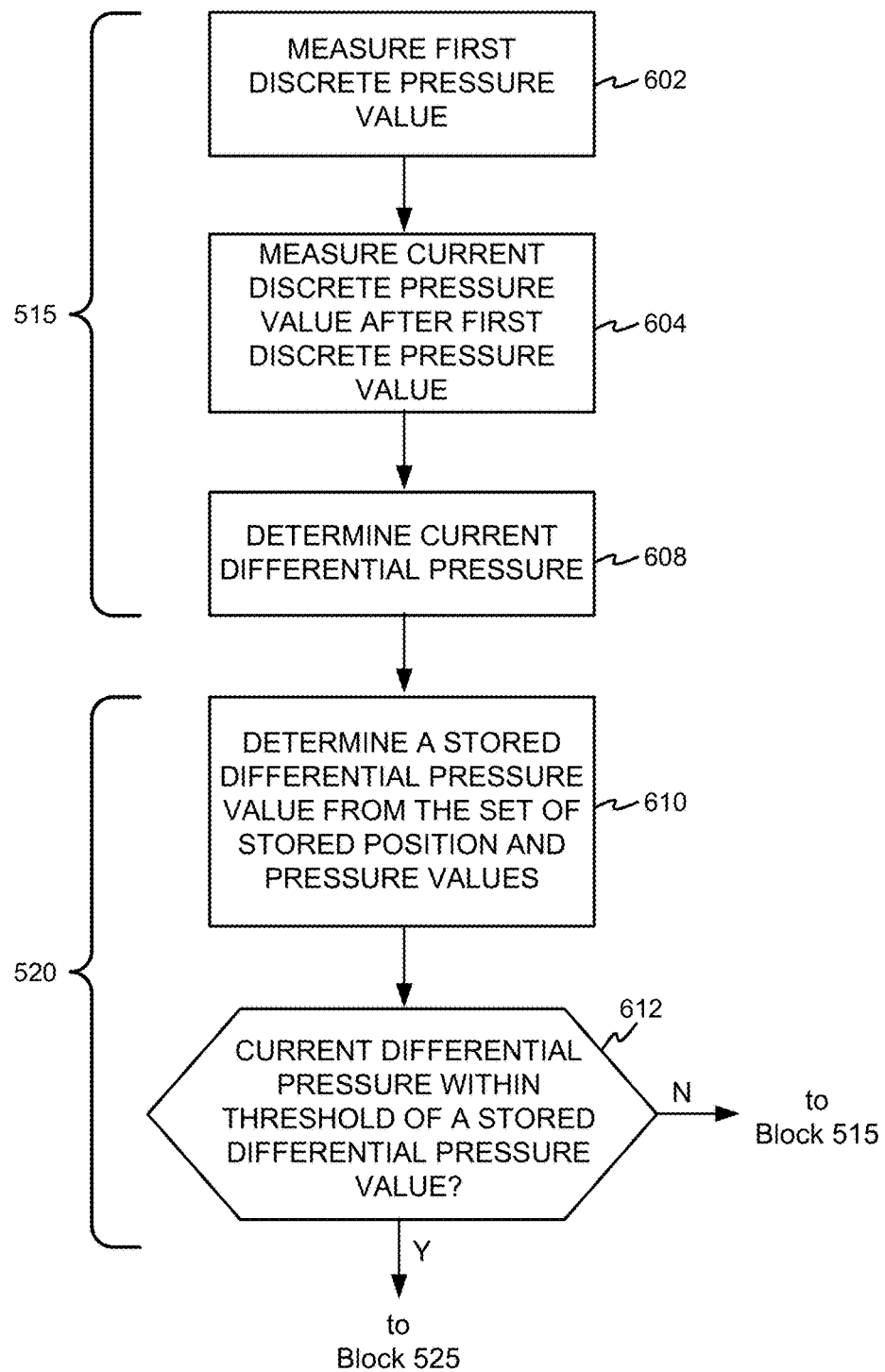
FIG. 6A is a flow chart showing exemplary details for determining position values based on differential pressure values for in the embodiment shown in FIG. 5.

FIG. 6A is a flow chart showing exemplary details for determining position values based on differential pressure values which may be used in the embodiment shown in FIG. 5. In an embodiment, where processor 315 determines whether the ascertained pressure value is within the threshold of a stored pressure value of the set of stored position and pressure values in Block 520, processor 315 may further calculate a differential discrete pressure value based on the discrete pressure value and a previously determined discrete pressure value. Processor 315 may additionally calculate and store a differential pressure value from the set of stored position and pressure values associated with the route, and then determine whether the differential discrete pressure value and the differential stored pressures value is within the threshold.

Specifically, in one embodiment for ascertaining a pressure value in Block 515 of FIG. 5, processor 315 may initially measure a first discrete pressure value (Block 602), and subsequently measure a current discrete pressure value after the first discrete pressure value (i.e., a second discrete pressure value which corresponds to the current position of the vehicle in Block 604). Processor 315 may then determine a current differential pressure value by calculating a difference between the current discrete pressure value and the first discrete pressure value (Block 608). Once the current differential pressure value is determined, the process for determining whether the ascertained pressure value is within the first threshold of the stored pressure value in Block 520 may further include having processor 315 determine a stored differential stored pressure value from the set of stored position and pressure values (Block 610). Determining a stored differential pressure may include retrieving stored differential pressure values as described above in relation to FIG. 2B. Alternatively, differential pressure values may be computed from stored discrete pressure values as provided in more detail below. Processor 315 may then determine whether the current differential pressure value and the stored differential pressure value is within the first threshold (Block 612). If affirmative, the processor may proceed to Block 525 to determine a position as described above. Alternatively, if the difference between the current differential pressure value and the stored differential value exceeds the first threshold, then processor 315 may determine if the correct route has been associated with the set of stored position and pressure values, as exemplified in FIGS. 6B and 6C.

The determination of position based on ascertained pressure values may be based on differential pressure values to mitigate the effects of changing atmospheric pressure and/or measurement calibration issues with the pressure sensors. For example, when determining whether the discrete pressure value is within a first threshold of a stored pressure value of the identified set of stored position and pressure values, processor 315 may ascertain at least one additional discrete pressure value, and then calculate a differential discrete pressure value based on the discrete pressure value and the at least one additional discrete pressure value. For example, differential pressure may be computed by simply calculating the difference of two adjacent ascertained pressure values. Processor 315 may then determine a differential stored pressure value from the identified set of stored position and pressure values, and then determine whether the differential discrete pressure value and the differential stored pressures value is within the first threshold. The differential stored pressure values may be computed from stored measured values as the vehicle traverses along a route. Alternatively, the differential stored pressure values may be precomputed and stored on a network device as differential pressure values.

Figure 6B:
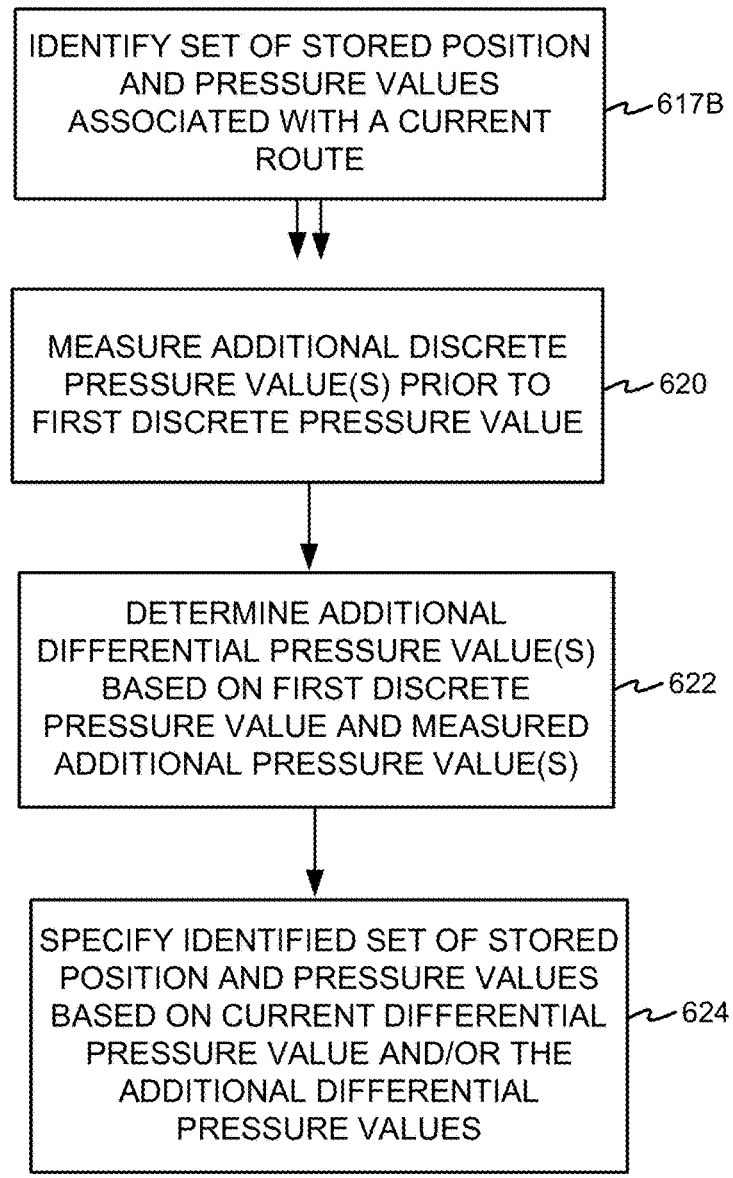
FIG. 6B is a flow chart showing exemplary details for identifying a set of stored position and pressure values based on differential pressure values for use in the embodiment of FIG. 5.

FIG. 6B is a flow chart showing an exemplary process 600B for identifying a set of stored position and pressure values based on differential pressure values. This process may be associated with Block 520 of FIG. 5, and may be executed by processor 315 of mobile device 300, or other components in mobile device 300 as indicated below. Processor 315 may initially identify a set of stored position and pressure values which may be associated with a route 227/267 of the vehicle (Block 617B). The identification may be thought of as an "alignment" or "matching" between the vehicle route 227/267 and a set of stored values which may correspond to the route. As will be discussed in more detail below in regards to FIGS. 6B and 6C, stored values may be identified by comparisons with measured values as a vehicle traverses route 227/267 and/or searches may be performed based on, for example, thresholds, to perform the identification. Additionally, various embodiments in Block 617B may involve multiple points and/or iterations to improve confidence in the set of stored position and measurement values which are identified.

The identification process in Block 617B may further include having processor 315 measure one or more additional discrete pressure value(s) prior to measuring the first discrete pressure value (Block 620). Processor 315 may then determine at least one additional differential pressure value by calculating one or more difference(s) between adjacent pressure values taken from the first discrete pressure value and an adjacent prior discrete pressure value, and/or one or more difference(s) in additional prior discrete pressure value(s) (Block 622). Processor 315 may then specify the identified set of stored position and pressure values from a plurality of sets of stored position and pressure values. The determination may be based on the current differential pressure value and/or one or more prior differential pressure values. The stored pressure values may be differential pressure values corresponding to the current route. Differences between the acquired differential pressure values and the stored differential pressure values may also be compared to match changes in differential pressure. Any matching technique may be used to identify the set of stored position and pressure values associated with the matching route. Such matching techniques may include, for example, correlations, trend matching algorithms, pattern matching algorithms, least squares techniques, etc. Alternatively, the stored differential values may be determined based on taking differences between discrete stored pressure values.

Figure 6C:
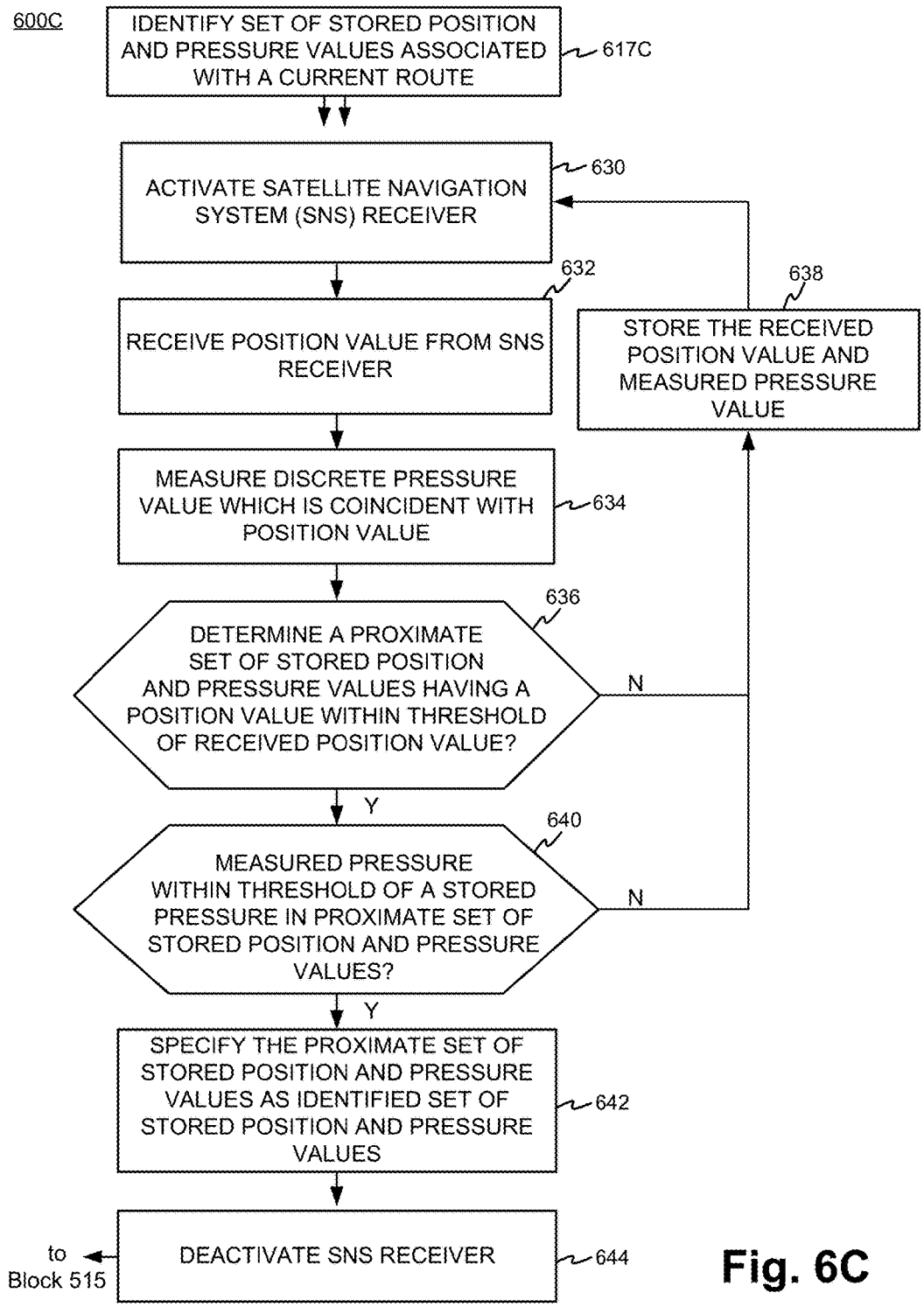
FIG. 6C is a flow chart showing an exemplary process for identifying a set of stored position and pressure values based on discrete pressure values for use in the embodiment of FIG. 5.

FIG. 6C is a flow chart showing another exemplary process 600C for identifying a set of stored position and pressure values based on discrete pressure values. This process may be associated with Block 520 of FIG. 5, which may be executed by processor 315 of mobile device 300, or other components in mobile device 300 as indicated below. Processor 315 may initially identify a set of stored position and pressure values which may be associated with a route 227/267 of the vehicle (Block 617C). As noted above, the identification may be thought of as an "alignment" or "matching" between the vehicle route 227/267 and a set of stored values which may correspond to the route. As will be discussed in more detail below, stored values may be identified by comparisons with measured values as a vehicle traverses route 227/267 and/or searches may be performed based on, for example, thresholds, to perform the identification. Additionally, various embodiments in Block 617C may involve multiple points and/or iterations to improve confidence in the set of stored position and measurement values which are identified.

The identification process in Block 617C may further include having processor 315 activate SNS receiver 350 to determine a current position (Block 630). SNS receiver 350 may determine position values in a standard reference system, such as, for example, WGS-84 when a GPS receiver is used. SNS receiver 350 may provide latitude and longitude positions of mobile device 300. In an alternative embodiment, a previously determined position of the vehicle may be stored in memory 320 when the vehicle is parked and the engine is stopped. This stored position may be used as a current position instead of a position generated by the SNS receiver 350, so the SNS receiver may remain off to conserve power. If the SNS receiver 350 is unable to determine an accurate position, other positioning sources, such as cell tower positioning, WiFi positioning, and/or Bluetooth positioning may be used as a substitute for, or to refine, the position determined by SNS receiver 350.

Processor 315 may then receive the position value generated by SNS receiver 350 (Block 630). Pressure sensor 360 may measure a pressure value from a barometric pressure sensor (Block 632). The measured pressure value may be substantially coincident in time with the generated position value. This may be done by coordinating the sampling frequencies and/or phases of the SNS receiver 350 and pressure sensor 360, or by processing the position and pressure values (e.g., filtering, interpolation, etc.) so data appears coincident when collected using different sampling frequencies and/or phases. Processor 315 may determine a proximate set of stored position and pressure values from a plurality of sets of stored position and pressure values (Block 636). This may be accomplished by identifying when the generated position value is within a threshold of a stored position value of the proximate set of stored position and pressure values. Alternatively, other methods, such as, for example, correlation, pattern matching, supervised/unsupervised machine learning, etc., may be used to determine the proximate set of stored position and pressure values. Other information used to determine the proximate set of stored position may include one or many of the following: SNS location accuracy, pressure error/noise measurements, and/or information collected from other sensors 365 (e.g. accelerometers, gyroscopes, etc.).

If a proximate set of stored position and pressure values are not determined in Block 636, process 600 may proceed to Block 638, wherein processor 315 may provide the received position value and measured barometric pressure value to output device(s) 340 of mobile device 300, or save the value in mobile device 300 in memory 320 or storage device 330. Processor 315 may loop back to Block 630 to receive another position value from SNS receiver 350 along route 227.

On the other hand, if a proximate set of stored position and pressure values are determined in Block 636, process 600 may proceed to Block 640, where processor 315 may then determine whether the measured pressure value is within a threshold of a stored pressure value of the proximate set of stored position and pressure values. If this is not the case, processor 315 loops back to Block 638 as described above. However, if the measured pressure is within a threshold of the stored pressure, processor 315 may specify the proximate set of stored position and pressure values as the identified set of stored position and pressure values (Block 642).

In an embodiment, where upon failing to determine the proximate set of stored position and pressure values, or upon determining the measured pressure value is not within the threshold of a stored pressure value, processor 315 may provide the generated position value and measured pressure value. Processor 315 may further generate at least one subsequent position value based on information from SNS receiver 350, and measure at least one subsequent pressure value coincident with the at least one subsequent position value. Processor 315 may repeat determining a proximate set of stored position and pressure values, and the determining whether the measured pressure value is within a threshold, for each of the at least one subsequent position and pressure values, until an identified set of stored position and pressure values is specified.

In one embodiment, the plurality of sets of stored position and pressure values include values that are aggregated from a plurality of mobile devices associated with distinct users. In other words, the sets of stored position and pressure values may be crowdsourced and stored on network device 500, as will be discussed in more detail in reference to FIG. 8A.

In an embodiment, processor 315 may determine whether the identified set of stored position and pressure values corresponds to a frequently traveled route, and then may store and/or transmit the generated position and measured pressure value to, for example, network device 500. In another embodiment, processor 315 may determine whether the identified set of stored position and pressure values do not correspond to a frequently traveled route, and may discard the ascertained pressure value, and then activate the SNS receiver 350 to receive subsequent position values, in response to determining that the identified set of stored position and pressure values do not correspond to a frequently traveled route.

Finally, processor 315 may then deactivate SNS receiver 350 upon identifying the set of stored position and pressure values in Block 642 (Block 644). Deactivating the SNS receiver 350 may place SNS receiver 350 in a power saving mode which may prolong the operating time of the battery of mobile device 300 between recharging.

Figure 7:
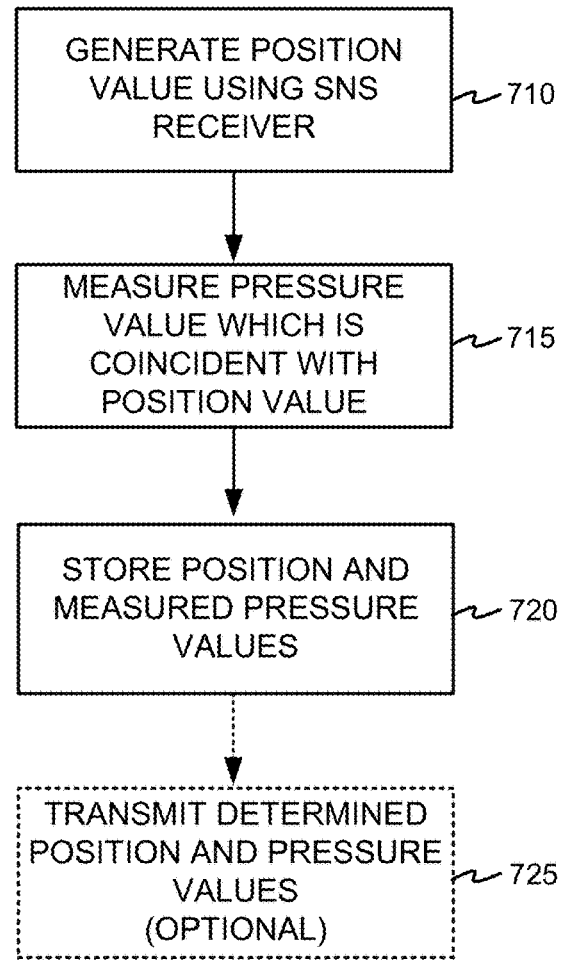
FIG. 7 is a flow chart showing an exemplary process of a mobile device which stores position and pressure values for subsequent use by the exemplary process shown in FIG. 5.

FIG. 7 is a flow chart showing an exemplary process 700 of a mobile device 300 which may store position and pressure values for subsequent use by exemplary processes 500A and 500B shown in FIGS. 5A and 5B, respectively. Process 700 may occur during routine travelling with the vehicle, where mobile device 300 collects both position and pressure values for future use and/or for crowdsourcing activities, such as for generating and storing pressure and corresponding location information for subsequent use by the same or another mobile device in determining its location based on comparing currently measured pressure data to the stored pressure and corresponding location information. Specifically, mobile device 300 may generate a position value using SNS receiver 350 (Block 710). Mobile device 300 may further measure a pressure value, using pressure sensor 360, which is substantially coincident in time with the position value generated in Block 710 (Block 715). This may occur by synchronizing the sampling clocks of SNS receiver 350 and pressure sensor 360. Alternatively, the position and pressure values data may be post-processed by filtering, interpolation, etc., so as to appear they were generated in a substantially coincident manner. Mobile device 300 may then store the generated position and measured pressure values internally for later use by process 500 (Block 720). Optionally (as indicated by dashed lines in FIG. 7), the position and pressure values may be provided (e.g., transmitted via wireless interface 345), to a network device for use by other mobile devices (Block 725) (e.g., crowdsourcing or uploading for a specific device for frequently traveled routes). In this manner, mobile device 300 may constantly be updating the stored position and pressure values in an ongoing manner to refine and improve their accuracy, and reflect any changes that may have occurred.

Figure 8A:
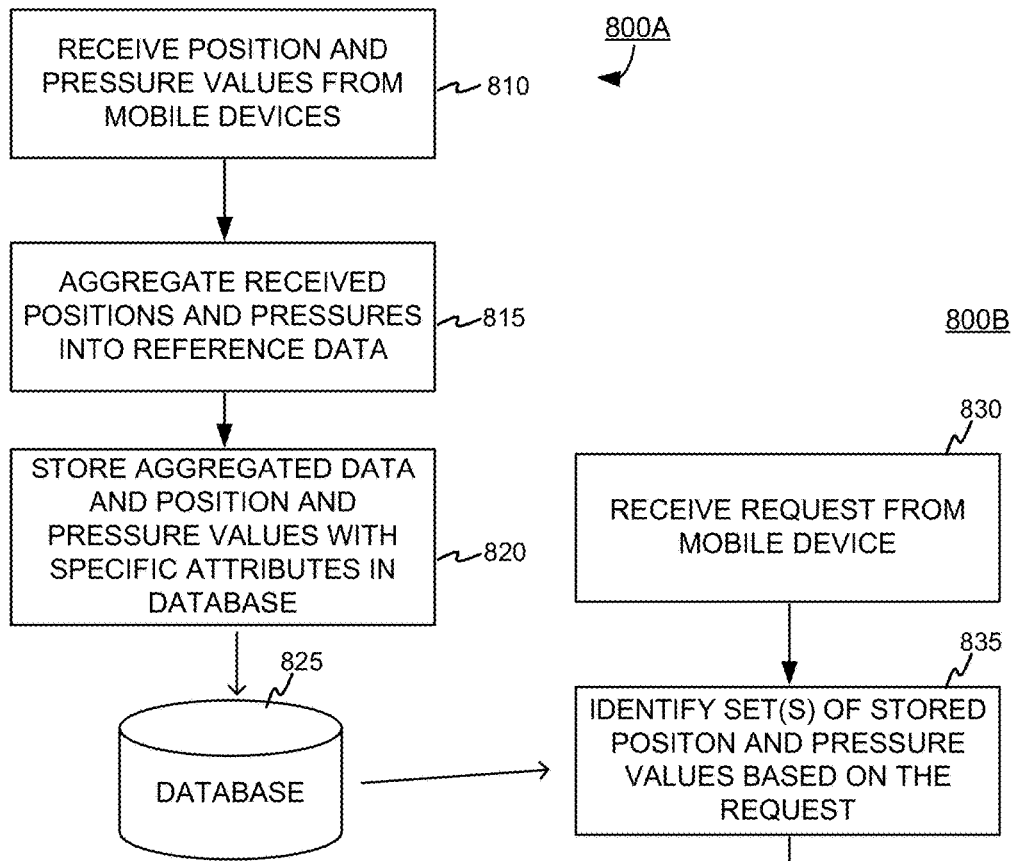
FIGS. 8A and 8B are flow charts showing exemplary processes for receiving, storing, distributing, and using crowdsourced stored position and pressure values.
Figure 8B:
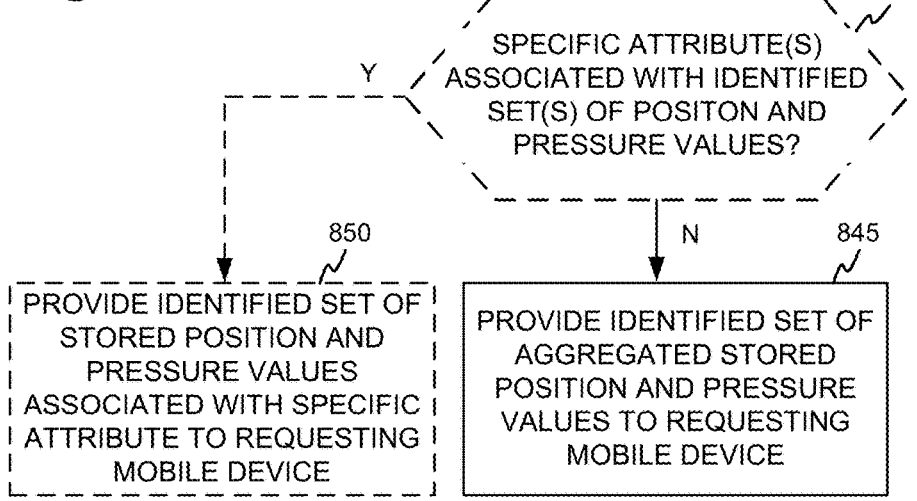

FIGS. 8A and 8B are flow charts showing exemplary processes for receiving, storing, distributing, and using crowdsourced stored position and pressure values which may be performed on network device 400. FIG. 8A shows process 800A where network device 400 may receive, aggregate, and store crowdsourced position and pressure values. FIGS. 8A and 8B are discussed in the context of using crowdsourced data, however the flow charts can be applied to data associated with a specific attribute, such as, for example, a single device, a device type, and/or route frequency (i.e., whether the route is a frequent route for a specific device). In the context of a single device traveling a frequent route, data sets associated with specific behavior may be more accurate in determining location for devices that frequently travel specific routes. FIG. 8B shows process 800B where network device 400 may provide crowdsourced position and pressure values, or datasets associated with a specific attribute(s), in response to requests from mobile device 300. Process 800A and 800B may be performed by processor 420 executing instructions in memory 430. Alternatively, in an embodiment where a peer-to-peer relationship among mobile devices is available, processes 800A and 800B may be performed by one or more additional mobile devices (other than the "requesting" mobile device described below).

Processor 420 may receive position and pressure values from one or more mobile devices 300 over communications interface 470 (Block 810). Additionally, position and pressure values associated with specific attribute(s) may be received, along with an identification of the specific attribute(s). The specific attributes may include auxiliary or supplemental information that may include, for example, a specific mobile device associated with a user, an indication whether the received position and pressure values are associated with the frequently traveled route for a specific device (e.g., a counter indicating how many times the specific device traveled the route, or a flag indicating the number as surpassed a predetermined threshold), a device type, etc. The pressure values may be stored, or differential pressure values may be computed and subsequently stored. Some calibration values may also be determined and stored which are associated with the received pressure values. Such calibration values may include barometric pressure references associated with the received pressure values, wherein the association may be based on geographic proximity at the time of collection of the received pressure values.

For example, in one embodiment, a given route or road segment may be broken up into multiple "sample distances," or short distances, which may correspond to a spatial sampling rate (which may be constant assuming a sampling device travels at a constant velocity along the route). For position and pressure values at each successive sample distance along a route, a particular direct pressure measurement, or value may be stored. In addition, a difference in pressure between the particular direct pressure measurement and a direct pressure measurement at a previous point along the route may be stored. (The difference in pressure between two sequentially successive points may be referred to herein as "differential pressure.") Assuming a small enough sample distance, regardless of the prevailing barometric pressure in the atmosphere, the differential pressure should not substantially change from a first sample time to a second sample time (e.g., hours, days, or weeks) event if the prevailing ambient barometric pressure differs. The change in presently measured pressure from one point to the next along a route may be determined (i.e., the differential pressure from the one point to the next along the route), and subsequently compared to a differential pressure value corresponding to the same points along the route determined from previously stored pressure values. If successive such comparisons of differential pressure match, within a predetermined tolerance, differential pressures determined for the same sequential points along the route from stored direct pressure values and corresponding location data, a navigation/mapping device, or system, may determine that the device presently acquiring the pressure data is traveling at the location and in the direction corresponding to the location and direction having the same differential pressure value determined from previously stored pressure values and associated location coordinates. The navigation/mapping device, or system, may take such a determination if the differential pressure value, and one or more preceding differential pressure values corresponding to sequentially preceding points along the present route match one or more differential pressure values that sequentially precede the point as determined from previously stored pressure and location data.

Processor 420 may then aggregate the received position and pressure values (Block 815). This aggregation may include resampling position and/or pressure values to a common timeline, assigning data to sets corresponding to routes, and/or statistically processing/filtering the data to improve accuracy and reduce noise. Additionally, the aggregation may involve calibration to remove effects of pressure variations due to weather conditions experienced by the mobile devices during the time of data collection. Additionally, when position and/or pressure values are associated with specific attributes, the unique data set may be preserved after aggregation in Block 815 to be passed on for storage in a databased 825. In Block processor 420 may then store both aggregated position and pressure values, and position and pressure values associated with specific attributers (if available), in database 825 (Block 820).

In order to utilize the stored data in database 825 and distribute the data to mobile devices 300 requesting data for positioning purposes, processor 420 may initially receive a request from a mobile device 300, which may include current position and pressure value(s) associated with mobile device 300 (Block 830). The request may also include one or more specific attributes that may be associated with the requesting mobile device 300, or associated with the current position and pressure value(s) (e.g., whether the received position and pressure value(s) are associated with the frequently travelled route). Processor 420 may identify a set of stored position and pressure values from database 825 based on the received request (Block 835). In an embodiment, processor 420 may optionally determine whether one or more specific attributes are associated with the position and pressure values (Block 840, wherein optional blocks are indicated using dashed lines in FIG. 8B). If a specific attribute is associated with the position and pressure values, processor 420 may provide an identified set of stored position and pressure values, which are associated with the specific attribute(s), to the requesting mobile device 300 for use in positioning activities, such as, for example, processes 500A and 500B shown in FIGS. 5A and 5B, respectively (Block 850). Alternatively, if no specific attribute is associated with the identified set of position and pressure values, Processor 420 may provide the identified set of aggregated stored position and pressure values to the requesting mobile device 300 for use in positioning activities, such as, for example, processes 500A and 500B shown in FIGS. 5A and 5B, respectively (Block 845).

As noted above, embodiments described herein are directed to navigation devices which may use information derived from crowdsourcing data (i.e., aggregating pressure and location data acquired from multiple devices over time as they traverse points along a route or way. In an embodiment, crowdsourced information may include data obtained through various broadcasting features provided through Long Term Evolution (LTE) wireless standards (e.g., LTE, LTE Advanced, etc.). Vehicles equipped with mobile devices may receive and send position and pressure data from/to a network device 400 over an LTE wireless network. The LTE broadcasting and/or multicasting standards may include Multimedia Broadcast Multicast System (MBMS) standards, such as, for example, the evolved Multimedia Broadcast Multicast System (eMBMS) standard. MBMS provides an efficient mechanism to deliver common content over LTE networks which may be directed to targeted service areas. MBMS allows the broadcast/multicast service areas to vary in size, and include venue specific areas (e.g., an arena), region specific areas, and nationwide areas. The MBMS standard permits flexible control of the service areas to provide information to groups in an efficient manner, as multicast makes more efficient use of the available network resources (e.g., wireless spectrum).

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 5A-8B, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    ascertaining a pressure value, the ascertaining further comprising:
        measuring a first discrete pressure value,
        measuring a current discrete pressure value after the first discrete pressure value, and
        determining a current differential pressure value by calculating a difference between the current discrete pressure value and the first discrete pressure value;
    determining whether the ascertained pressure value is within a first threshold of a stored pressure value from a set of stored position and pressure values associated with a route, which further comprises:
        determining a stored differential pressure value from the set of stored position and pressure values, and
        determining whether the current differential pressure value and the stored differential pressure value are within the first threshold;
    obtaining a stored position value, from the set of stored position and pressure values, which corresponds to a stored pressure value, in response to determining that the ascertained pressure value is within the first threshold of the stored pressure value; and
    providing the stored position value as a current location along the route.

2. The method of claim 1, comprising:
    identifying the set of stored position and pressure values associated with the route, wherein the identifying further comprises:
        measuring at least one additional discrete pressure value prior to measuring the first discrete pressure value;
        determining at least one additional differential pressure value by calculating at least one difference between adjacent pressure values taken from the first discrete pressure value and the at least one additional discrete pressure value; and
        specifying the identified set of stored position and pressure values from a plurality of sets of stored position and pressure values based on at least one of the current differential pressure value or the at least one differential pressure value, wherein the stored pressure values are differential pressure values corresponding to the current route.

3. The method of claim 1, comprising:
    identifying the set of stored position and pressure values associated with the route, wherein the identifying further comprises:
        activating a satellite navigation system (SNS) receiver;
        generating a position value from the SNS receiver;
        measuring a discrete pressure value from a pressure sensor, wherein the measured pressure value is substantially coincident in time with the generated position value;
        determining a proximate set of stored position and pressure values from a plurality of sets of stored position and pressure values, wherein the generated position value is within a second threshold of a stored position value of the proximate set of stored position and pressure values;
        determining whether the measured pressure value is within a third threshold of a stored pressure value of the proximate set of stored position and pressure values;
        specifying the proximate set of stored position and pressure values as the identified set of stored position and pressure values in response to determining that the measured pressure value is within the third threshold of the stored pressure value of the proximate set of stored position and pressure values; and
        deactivating the SNS receiver.

4. The method of claim 3, wherein upon failing to determine the proximate set of stored position and pressure values, or upon determining the measured pressure value is not within the third threshold of a stored pressure value, the method further comprises:
    storing the generated position value and measured pressure value;
    generating at least one subsequent position value by the SNS receiver;
    measuring at least one subsequent pressure value coincident in time with the at least one subsequent position value; and
    repeating the determining a proximate set of stored position and pressure values, and the determining whether the measured pressure value is within the third threshold, for each of the at least one subsequent position and pressure values, until an identified set of stored position and pressure values is specified.

5. The method of claim 2, wherein at least one of the plurality of sets of stored position and pressure values include values that are aggregated from a plurality of mobile devices associated with distinct users.

6. The method of claim 3, further comprising:
determining whether the identified set of stored position and pressure values corresponds to a frequently traveled route; and
at least one of storing or transmitting the generated position and measured pressure value.

7. The method of claim 3, further comprising:
determining a SNS receiver is unable provide position values; and
designating a last known position value as a current position value for the identifying the set of stored position and pressure values.

8. A mobile device, comprising:
a wireless interface that communicates over a wireless channel;
a pressure sensor configured to measure pressure values;
a Satellite Navigation System (SNS) receiver configured to generate position values;
a memory configured to store instructions; and
a processor, coupled to the wireless interface, the SNS receiver, and the memory, wherein the processor is configured to execute the instructions stored in the memory to:
ascertain a pressure value based on at least one discrete pressure value received from the pressure sensor, wherein the instructions to ascertain a pressure value further cause the processor to:
measure a first discrete pressure value,
measure a current discrete pressure value after the first discrete pressure value, and
determine a current differential pressure value by calculating a difference between the current discrete pressure value and the first discrete pressure value,
determine whether the ascertained pressure value is within a first threshold of a stored pressure value from a set of stored position and pressure values associated with a route, wherein the instructions to determine whether the ascertained pressure value is within a first threshold further cause the processor to:
determine a stored differential pressure value from the set of stored position and pressure values, and
determine whether the current differential pressure value and the stored differential pressure value are within the first threshold,
obtain a stored position value, from the set of stored position and pressure values, which corresponds to a stored pressure value, in response to determining that the ascertained pressure value is within the first threshold of the stored pressure value, and
provide the stored position value as a current location along the route.

9. The mobile device of claim 8, wherein the instructions further cause the processor to:
identify the set of stored position and pressure values associated with the route, and wherein the instructions to identify further cause the processor to:
measure at least one additional discrete pressure value prior to measuring the first discrete pressure value,
determine at least one additional differential pressure value by calculating at least one difference between adjacent pressure values taken from the first discrete pressure value and the at least one additional discrete pressure value, and
determine the identified set of stored position and pressure values from a plurality of sets of stored position and pressure values based on at least one of the current differential pressure value or the at least one differential pressure value, wherein the stored pressure values are differential pressure values corresponding to the current route.

10. The mobile device of claim 8, wherein the instructions further cause the processor to:
identify the set of stored position and pressure values associated with the route, and wherein the instructions to identify further cause the processor to:
activate the SNS receiver and receive a position therefrom,
receive a measured discrete pressure value from the pressure sensor, wherein the measured pressure value is substantially coincident in time with the received position,
determine a proximate set of stored position and pressure values from a plurality of sets of stored position and pressure values, wherein the received position value is within a second threshold of a stored position value of the proximate set of stored position and pressure values,
determine whether the measured pressure value is within a third threshold of a stored pressure value of the proximate set of stored position and pressure values,
specify the proximate set of stored position and pressure values as the identified set of stored position and pressure values in response to determining that the measured pressure value is within the third threshold of the stored pressure value of the proximate set of stored position and pressure values, and
deactivate the SNS receiver.

11. The mobile device of claim 10, wherein upon the processor failing to determine the proximate set of stored position and pressure values, or upon determining the measured pressure value is not within the third threshold of a stored pressure value, the instructions further cause the processor to:
store the received position value and discrete pressure value,
receive at least one subsequent position value from the SNS receiver,
measure at least one subsequent pressure value coincident in time with the at least one subsequent position value, and
repeat the determining a proximate set of stored position and pressure values, and the determining whether the measured pressure value is within the third threshold, for each of the at least one subsequent position and pressure values, until an identified set of stored position and pressure values is specified.

12. The mobile device of claim 9, wherein at least one of the plurality of sets of stored position and pressure values include values that are aggregated from a plurality of mobile devices associated with distinct users.

13. The mobile device of claim 10, wherein the instructions further cause the processor to:
determine whether the identified set of stored position and pressure values corresponds to a frequently traveled route, and at least one of store or transmit the received position and measured pressure value.

14. The mobile device of claim 10, wherein instructions further cause the processor to:
   determine the SNS receiver is unable provide position values, and
   designate a last known position value as a current position value for identifying a set of stored position and pressure values.

15. The mobile device of claim 8, wherein instructions further cause the processor to:
   ascertain at least one additional discrete pressure value;
   obtain at least one additional stored position value based on the at least one additional discrete pressure value; and
   determine a velocity based upon differences between the at least one additional stored position value or the stored position value, and a sampling rate of the discrete pressure value.

16. A non-transitory computer-readable medium comprising instructions, which, when executed by a processor, cause the processor to:
   ascertain a pressure value based on at least one discrete pressure value received from a pressure sensor, wherein the instructions to ascertain a pressure further cause the processor to:
      measure a first discrete pressure value,
      measure a current discrete pressure value after the first discrete pressure value, and
      determine a current differential pressure value by calculating a difference between the current discrete pressure value and the first discrete pressure value;
   determine whether the ascertained pressure value is within a first threshold of a stored pressure value from a set of stored position and pressure values associated with a route, wherein the instructions to determine whether the ascertained pressure value is within a first threshold further cause the processor to:
      determine a stored differential pressure value from the set of stored position and pressure values, and
      determine whether the current differential pressure value and the stored differential pressure value are within the first threshold;
   obtain a stored position value, from the set of stored position and pressure values, which corresponds to a stored pressure value, in response to determining that the ascertained pressure value is within the first threshold of the stored pressure value; and
   provide the stored position value as a current location along the route.

17. The non-transitory computer-readable medium of claim 16, wherein the instructions further cause the processor to:
   identify the set of stored position and pressure values associated with the route, wherein the instructions to identify further cause the processor to:
   measure at least one additional discrete pressure value prior to measuring the first discrete pressure value;
   determine at least one additional differential pressure value by calculating at least one difference between adjacent pressure values taken from the first discrete pressure value and the at least one additional discrete pressure value; and
   determine the identified set of stored position and pressure values from a plurality of sets of stored position and pressure values based on at least one of the current differential pressure value or the at least one differential pressure value, wherein the stored pressure values are differential pressure values corresponding to the current route.

18. The non-transitory computer-readable medium of claim 16, wherein the instructions further cause the processor to:
   identify the set of stored position and pressure values associated with the route, wherein the instructions to identify further cause the processor to:
   activate a SNS receiver and receive a position therefrom;
   receive a measured discrete pressure value from the pressure sensor, wherein the measured pressure value is substantially coincident in time with the received position value;
   determine a proximate set of stored position and pressure values from a plurality of sets of stored position and pressure values, wherein the received position value is within a second threshold of a stored position value of the proximate set of stored position and pressure values;
   determine whether the measured pressure value is within a third threshold of a stored pressure value of the proximate set of stored position and pressure values;
   specify the proximate set of stored position and pressure values as the identified set of stored position and pressure values in response to determining that the measured pressure value is within the third threshold of the stored pressure value of the proximate set of stored position and pressure values; and
   deactivate the SNS receiver.

19. The non-transitory computer-readable medium of claim 18, wherein upon failing to determine the proximate set of stored position and pressure values, or upon determining the measured pressure value is not within the third threshold of a stored pressure value, the instructions further cause the processor to:
   store the generated position value and measured pressure value;
   generate at least one subsequent position value by the SNS receiver;
   measure at least one subsequent pressure value coincident in time with the at least one subsequent position value; and
   repeat the determining a proximate set of stored position and pressure values, and the determining whether the measured pressure value is within the third threshold, for each of the at least one subsequent position and pressure values, until an identified set of stored position and pressure values is specified.

20. The non-transitory computer-readable medium of claim 16, wherein at least one of the plurality of sets of stored position and pressure values include values that are aggregated from a plurality of mobile devices associated with distinct users.

* * * * *